United States Patent
Yamada et al.

[19]

[11] Patent Number: 5,905,346
[45] Date of Patent: May 18, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata; Ryouji Mizutani, both of Aichi-ken; Ryuji Toh, Toyota, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,210

[22] Filed: Apr. 26, 1996

[30] Foreign Application Priority Data

| May 19, 1995 | [JP] | Japan | 7-145575 |
| Sep. 19, 1995 | [JP] | Japan | 7-266475 |

[51] Int. Cl.⁶ .................. H02K 5/00; B60K 1/00
[52] U.S. Cl. ............... 318/50; 318/67; 318/146; 318/9; 477/13; 477/179; 180/65.3
[58] Field of Search ............... 318/146, 56, 63, 318/432, 9, 10, 50, 87, 67, 140; 477/5, 13, 15, 8, 20, 30, 179; 364/424.1, 424.026, 426; 310/92, 102 R, 95; 180/65.1, 65.2, 65.3, 270

[56] References Cited

U.S. PATENT DOCUMENTS

| 3,623,568 | 11/1971 | Mori . | |
| 3,683,249 | 8/1972 | Shibata . | |
| 3,789,281 | 1/1974 | Shibata . | |
| 3,866,703 | 2/1975 | Eastham | 180/65.1 |
| 4,309,620 | 1/1982 | Heidemeyer et al. | 180/65.2 |
| 4,335,429 | 6/1982 | Kawakatsu | 180/65.2 |
| 4,351,405 | 9/1982 | Fields et al. . | |
| 4,533,011 | 8/1985 | Bock | 180/65.2 |
| 5,085,101 | 2/1992 | Oldfield | 74/730.1 |
| 5,498,216 | 3/1996 | Bitsche et al. | 477/20 |
| 5,501,641 | 3/1996 | Kollermeyer et al. | 475/107 |
| 5,635,805 | 6/1997 | Ibaraki et al. | 318/139 |
| 5,637,987 | 6/1997 | Fattic et al. | 180/65.3 |
| 5,644,200 | 7/1997 | Yang | 318/139 |
| 5,720,690 | 2/1998 | Hara et al. | 180/65.2 |

FOREIGN PATENT DOCUMENTS

| 58401/73 | 1/1975 | Australia . |
| 0 725 474 | 8/1996 | European Pat. Off. . |
| 29 28 770 | 1/1981 | Germany . |
| 30 25 756 A1 | 1/1982 | Germany . |
| 49-43311 | 4/1974 | Japan . |
| 53-133814 | 11/1978 | Japan . |
| 55-103100 | 8/1980 | Japan . |
| 1193965 | 6/1970 | United Kingdom . |

OTHER PUBLICATIONS

Patent Abstracts of Japan, Publication No. 56145702, Dec. 11, 1981.
Patent Abstracts of Japan, Publication No. 07123518, Dec. 05, 1995.
German Patent Abstract, No. DE 29 28 770.

*Primary Examiner*—John W. Cabeca
*Attorney, Agent, or Firm*—Oliff & Berridge, PLC

[57] ABSTRACT

A power output apparatus (20) of the present invention includes a clutch motor (30), an assist motor (40), and a controller (80) for controlling the clutch motor (30) and the assist motor (40). The clutch motor (30) includes an outer rotor (32) linked with a crankshaft (56) of a gasoline engine (50) and an inner rotor (34) connecting with a drive shaft (22). The assist motor (40) includes a rotor (42) connecting with the drive shaft (22). A control CPU (90) of the controller (80) controls a first driving circuit (91) to make the clutch motor (30) carry out power operation, so that the drive shaft (22) is rotated at a revolving speed higher than that of the crankshaft (56). The control CPU (90) also controls a second driving circuit (92) to make the assist motor (40) carry out regenerative operation. The electric power regenerated by the assist motor (40) is supplied to the clutch motor (30) to cover the electric power consumed by the clutch motor (30). The power output apparatus (20) of the invention transmits or utilizes the power generated by the gasoline engine (50) at a high efficiency and enables the drive shaft (22) to rotate at a revolving speed higher than that of the crankshaft (56).

11 Claims, 20 Drawing Sheets

POWER OUTPUT APPARATUS AND METHOD OF CONTROLLING THE SAME

BACKGROUND OF THE INVENTION

The present invention relates to a power output apparatus and a method of controlling the same. More specifically, the invention pertains to a power output apparatus for transmitting or utilizing power generated by an engine at a high efficiency and rotating a drive shaft at a revolving speed higher than that of the output shaft of the engine. The invention also pertains to a method of controlling such a power output apparatus.

DESCRIPTION OF THE PRIOR ART

Torque converters utilizing a fluid are generally used to convert an output torque of an engine or the like to power and transmit the converted power. In the conventional fluid-based torque converters, an input shaft and an output shaft are not fully locked with each other and there is accordingly an energy loss corresponding to a slip occurring between the input shaft and the output shaft. The energy loss, which is consumed as a heat, is expressed as the product of the revolving speed difference between the input shaft and the output shaft and the torque transmitted at that time. In vehicles with such a torque converter mounted thereon, a large energy loss occurs in transient state like a starting time. The efficiency of power transmission is not 100% even in stationary driving. Compared with manual transmissions, the torque converters lead to a lower fuel consumption.

Some proposed power output apparatus do not use a fluid for torque conversion or power transmission unlike the conventional torque converters, but transmit power through mechanical-electrical-mechanical conversion. For example, a power output apparatus disclosed in JAPANESE PATENT LAYING-OPEN GAZETTE No. 53-133814 couples an output shaft of an engine with a rotating shaft of a d.c. motor via an electromagnetic coupling to make the rotating shaft work as a drive shaft. The engine drives one rotor on the side of d.c. field winding of the electromagnetic coupling, while the other rotor on the side of a.c. armature winding drives the rotating shaft of the d.c. motor or the drive shaft. Electric power produced by a slip between the two rotors of the electromagnetic coupling is supplied from the rotor on the side of a.c. armature winding to the d.c. motor via a rectifier. The d.c. motor also receives electric power from a battery to rotate the drive shaft. Unlike the conventional fluid-based torque converters, this proposed structure substantially has no energy loss due to the slip. It is accordingly possible to make the energy loss in the power transmission means relatively small by enhancing the efficiencies of the electromagnetic coupling and the d.c. motor.

In the proposed power output apparatus discussed above, however, the rotating shaft of the d.c. motor (that is, the drive shaft) is controlled to be rotated at a revolving speed lower than that of the output shaft of the engine in stationary state. At a starting time of the engine, the revolving speed of the drive shaft temporarily becomes higher than that of the output shaft of the engine, though. The proposed structure does not take into account the operation in overdrive state, where the drive shaft is rotated at a revolving speed higher than that of the output shaft of the engine.

SUMMARY OF THE INVENTION

The object of the present invention is thus to provide a power output apparatus which transmits or utilizes power from an engine at a high efficiency and enables a drive shaft to rotate at a revolving speed higher than that of the output shaft of the engine, and also to provide a method of controlling such a power output apparatus.

At least part of the above object is realized by a first power output apparatus for outputting power to a drive shaft.

The first power output apparatus comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with either one of the drive shaft and the output shaft of the engine, the stator being electromagnetically coupled with the third rotor; second motor-driving means for exchanging electric currents with the second motor to vary the electromagnetic coupling of the stator with the third rotor; and control means for controlling the first and second motor-driving means to adjust revolving speeds of the drive shaft and the output shaft of the engine, so that the revolving speed of the drive shaft is higher than the revolving speed of the output shaft.

In the first power output apparatus, the revolving speed of the drive shaft is increased to be higher than the revolving speed of the output shaft of the engine. Therefore if the first power output apparatus is mounted on a vehicle to drive its axles, the vehicle falls in overdrive state. Namely even when the vehicle is driven at high speed, the first power output apparatus enables the engine to be driven at a high efficiency without increasing the revolving speed of the output shaft of the engine, thereby improving fuel consumption.

In accordance with one aspect of the invention, the control means comprises means for controlling the second motor-driving means to enable the second motor to regenerate electric power, and controlling the first motor-driving means to supply the regenerated electric power to the first motor to drive the first motor.

In this structure, the electric power regenerated by the second motor makes up for the electric power consumed by the first motor. This increases the revolving speed of the drive shaft to be higher than the revolving speed of the output shaft of the engine.

In accordance with anther aspect of the invention, the first power output apparatus further comprises storage means for storing electric power. And the control means comprises means for controlling the second motor-driving means to enable the second motor to regenerate electric power, and controlling the first motor-driving means to supply the regenerated electric power and the electric power stored in the storage means to the first motor to drive the first motor.

This structure rotates the drive shaft not only with the electric power regenerated by the second motor but with the electric power stored in the storage means, thereby outputting a sufficiently large torque to the drive shaft.

In accordance with still another aspect of the invention, the first power output apparatus further comprises storage means for storing electric power. And the control means comprises means for controlling the second motor-driving means to enable the second motor to regenerate electric power, and controlling the first motor-driving means to supply the regenerated electric power to the first motor to drive the first motor and at least partly to the storage means to be stored.

This structure is especially suitable for the case where the storage means has little residual capacity.

In accordance with still another aspect of the invention, the first power output apparatus further comprises storage means for storing electric power. And the control means comprises means for controlling the first motor-driving means to supply the electric power from the storage means to the first motor to drive the first motor.

Therefore, in this structure, electric power is not supplied to the storage means since the second motor does not carry out regeneration of electric power. Instead, electric power stored by the first motor in the storage means is actively consumed. This operation can reduce the electric power in the storage means to an appropriate level even when the storage means has been fully charged.

In accordance with another aspect of the invention, the first power output apparatus further comprises storage means for storing electric power. And the control means comprises means for controlling the second motor-driving means to supply the electric power from the storage means to the second motor to drive the second motor, and controlling the first motor-driving means to supply the electric power from the storage means to the first motor to drive the first motor.

This structure enables both the first motor and the second motor to carry out the power operation. The drive shaft accordingly receives not only the torque produced by the first motor but also the torque produced by the second motor, which acts in the direction of rotation of the drive shaft. Namely a large torque is applied to the drive shaft. This structure is especially suitable for the case where a large torque is required, for example, when the vehicle comes to a slope or when the driver wants to pass another vehicle during the high-speed driving on the free way or the highway.

In accordance with still another aspect of the invention, a second power output apparatus for outputting power to a drive shaft comprises an engine having an output shaft; a motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; motor-driving means for exchanging electric currents with the motor to vary the electromagnetic coupling of the first rotor with the second rotor; storage means for storing electric power; and control means for controlling the motor-driving means to supply the electric power from the storage means to the motor to drive the motor, thereby rotating the drive shaft at a revolving speed which is higher than a revolving speed of the output shaft of the engine.

In the second power output apparatus having only one motor, the motor is driven with the electric power stored in the storage means, in order to make the drive shaft rotate at a revolving speed higher than that of the output shaft of the engine. This structure also realizes overdrive control.

In accordance with another aspect of the invention, a third power output apparatus for outputting mechanical energy as power to a drive shaft comprises: an engine connected with a rotating shaft; a first motor connected with the rotating shaft; and a second motor connected with the drive shaft; wherein the engine produces mechanical energy and transmits the mechanical energy to the rotating shaft; the first motor converts electrical energy supplied from the second motor to mechanical energy and transmits to the second motor a sum of the converted mechanical energy and the mechanical energy transmitted via the rotating shaft; the second motor converts part of the mechanical energy transmitted from the first motor to electrical energy, supplies the electrical energy to the first motor, and outputs the remainder of the transmitted mechanical energy to the drive shaft; and the first motor is driven to rotate the drive shaft at a revolving speed which is higher than a revolving speed of the rotating shaft.

The third power output apparatus of the invention can transmit or utilize the mechanical energy produced by the engine at a high efficiency through the energy conversion.

In accordance with still another aspect of the invention, an fourth power output apparatus for outputting mechanical energy as power to a drive shaft comprises: an engine connected with a rotating shaft; a first motor connected with the rotating shaft; a second motor connected with the drive shaft; and storage means for storing electrical energy; wherein the engine produces mechanical energy and transmits the mechanical energy to the rotating shaft; the storage means stores electrical energy and supplies the stored electrical energy to the first motor; the first motor converts electrical energy supplied from the second motor and storage means to mechanical energy and transmits to the second motor a sum of the converted mechanical energy and the mechanical energy transmitted via the rotating shaft; the second motor converts part of the mechanical energy transmitted from the first motor to electrical energy, supplies the electrical energy to the first motor, and outputs the remainder of the transmitted mechanical energy to the drive shaft; and the first motor is driven to rotate the drive shaft at a revolving speed which is higher than a revolving speed of the rotating shaft.

This structure is preferably applied to the case where the second motor can not supply sufficient electrical energy.

In accordance with another aspect of the invention, a fifth power output apparatus for outputting mechanical energy as power to a drive shaft comprises: an engine connected with a rotating shaft; a motor connected with the rotating shaft and the drive shaft; and storage means for storing electrical energy; wherein the engine produces mechanical energy and transmits the mechanical energy to the rotating shaft; and the motor converts the electrical energy supplied from the storage means to mechanical energy and outputs a sum of the converted mechanical energy and the mechanical energy transmitted via the rotating shaft to the drive shaft; and the motor is driven to rotate the drive shaft at a revolving speed which is higher than a revolving speed of the rotating shaft.

In this structure, the drive shaft can receive the mechanical energy obtained through the conversion of electrical energy stored in the storage means, in addition to the mechanical energy produced by the engine. Namely large mechanical energy is applied to the drive shaft.

In accordance with still another aspect of the invention, an sixth power output apparatus for outputting mechanical energy as power to a drive shaft comprises: an engine connected with a rotating shaft; a first motor connected with the rotating shaft; a second motor connected with the drive shaft; and storage means for storing electrical energy; wherein the engine produces mechanical energy and transmits the mechanical energy to the rotating shaft; the first motor converts the electrical energy supplied from the storage means to mechanical energy and transmits to the second motor a sum of the converted mechanical energy and the mechanical energy transmitted via the rotating shaft; the second motor converts the electrical energy supplied from the storage means to mechanical energy and outputs a sum of the converted mechanical energy and the mechanical energy transmitted from the first motor to the drive shaft; and the first motors is driven to rotate the drive shaft at a revolving speed which is higher than a revolving speed of the rotating shaft.

The drive shaft accordingly receives large mechanical energy.

In accordance with another aspect of the invention, a seventh power output apparatus for outputting mechanical energy as power to a drive shaft comprises: an engine connected with a rotating shaft; a first motor connected with the drive shaft; a second motor connected with the rotating shaft; and storage means for storing electrical energy; wherein the engine produces mechanical energy and transmits the mechanical energy to the rotating shaft; the second motor converts part of the mechanical energy transmitted via the rotating shaft to electrical energy, supplies the electrical energy to the first motor, and transmits the remainder of the transmitted mechanical energy to the first motor; the first motor converts the electrical energy supplied from the second motor to mechanical energy and outputs a sum of the converted mechanical energy and the mechanical energy transmitted from the second motor to the drive shaft; and the second motor is driven to rotate the drive shaft at a revolving speed which is higher than a revolving speed of the rotating shaft.

The seventh power output apparatus of the invention exerts the same effects as those of the third power output apparatus discussed above.

The above object is also realized by a method of controlling a power output apparatus for outputting power to a drive shaft.

The method comprises: the steps of: (a) providing an engine having an output shaft; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; and a second motor comprising a stator and a third rotor connected with the drive shaft, the stator being electromagnetically coupled with the third rotor; and (b) adjusting revolving speeds of the drive shaft and the output shaft of the engine, so that the revolving speed of the drive shaft is higher than the revolving speed of the output shaft.

Even when the revolving speed of the drive shaft is high, the method enables the engine to be driven at a high efficiency without increasing the revolving speed of the output shaft of the engine.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
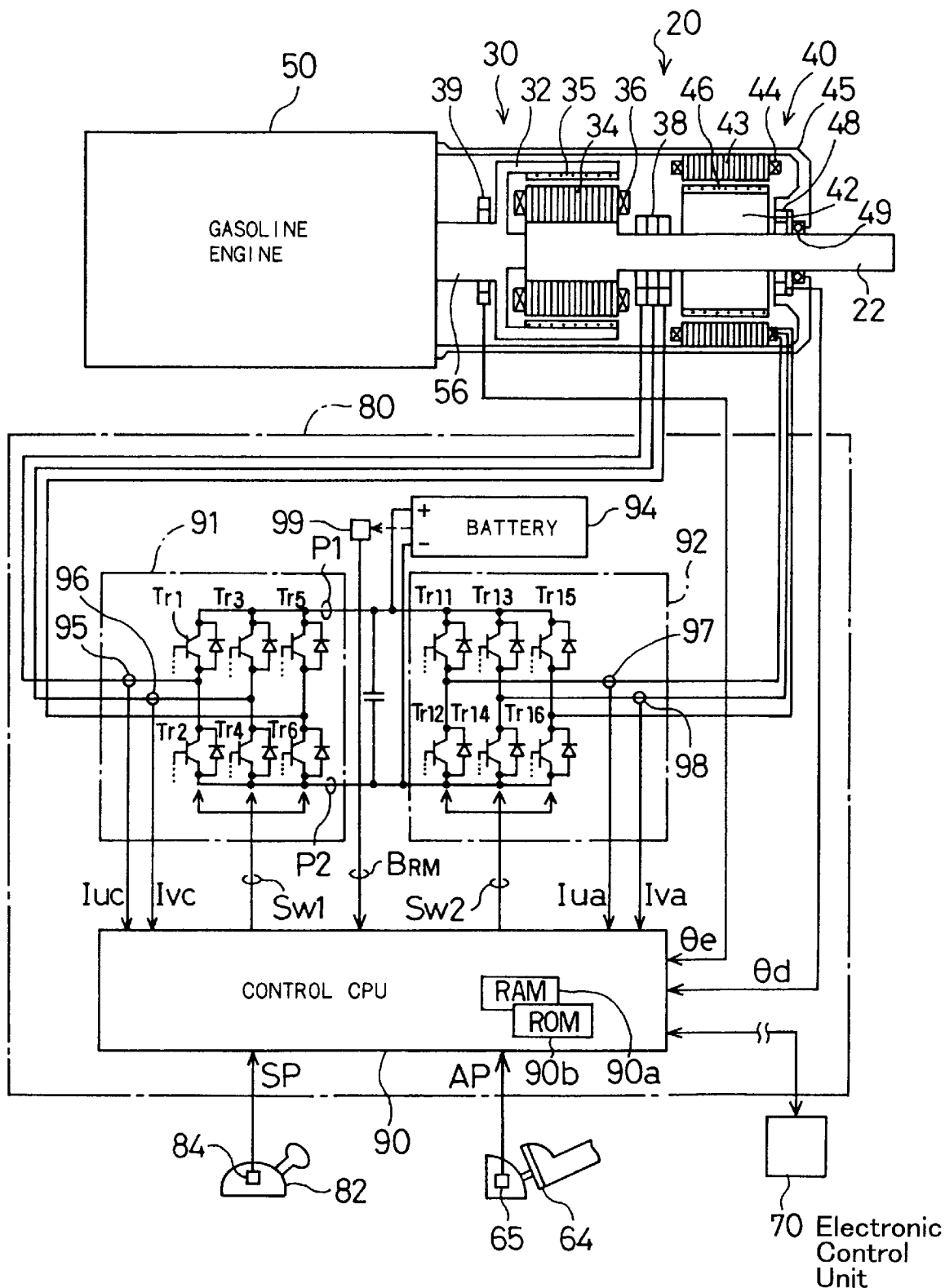
FIG. 1 schematically illustrates structure of a power output apparatus 20 as a first embodiment according to the present invention.
Figure 2:
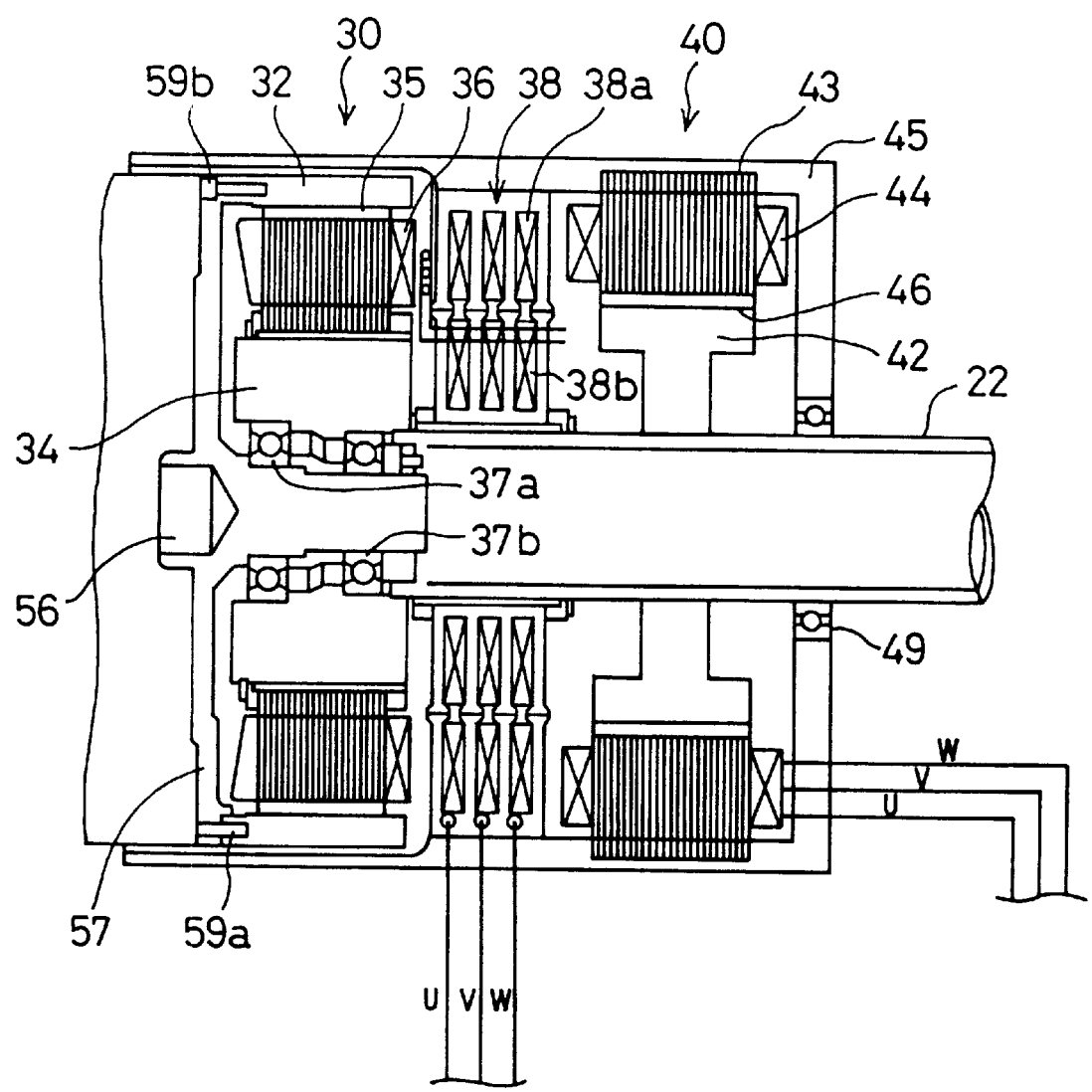
FIG. 2 is a cross sectional view illustrating detailed structures of a clutch motor 30 and an assist motor 40 included in the power output apparatus 20 of FIG. 1.
Figure 3:
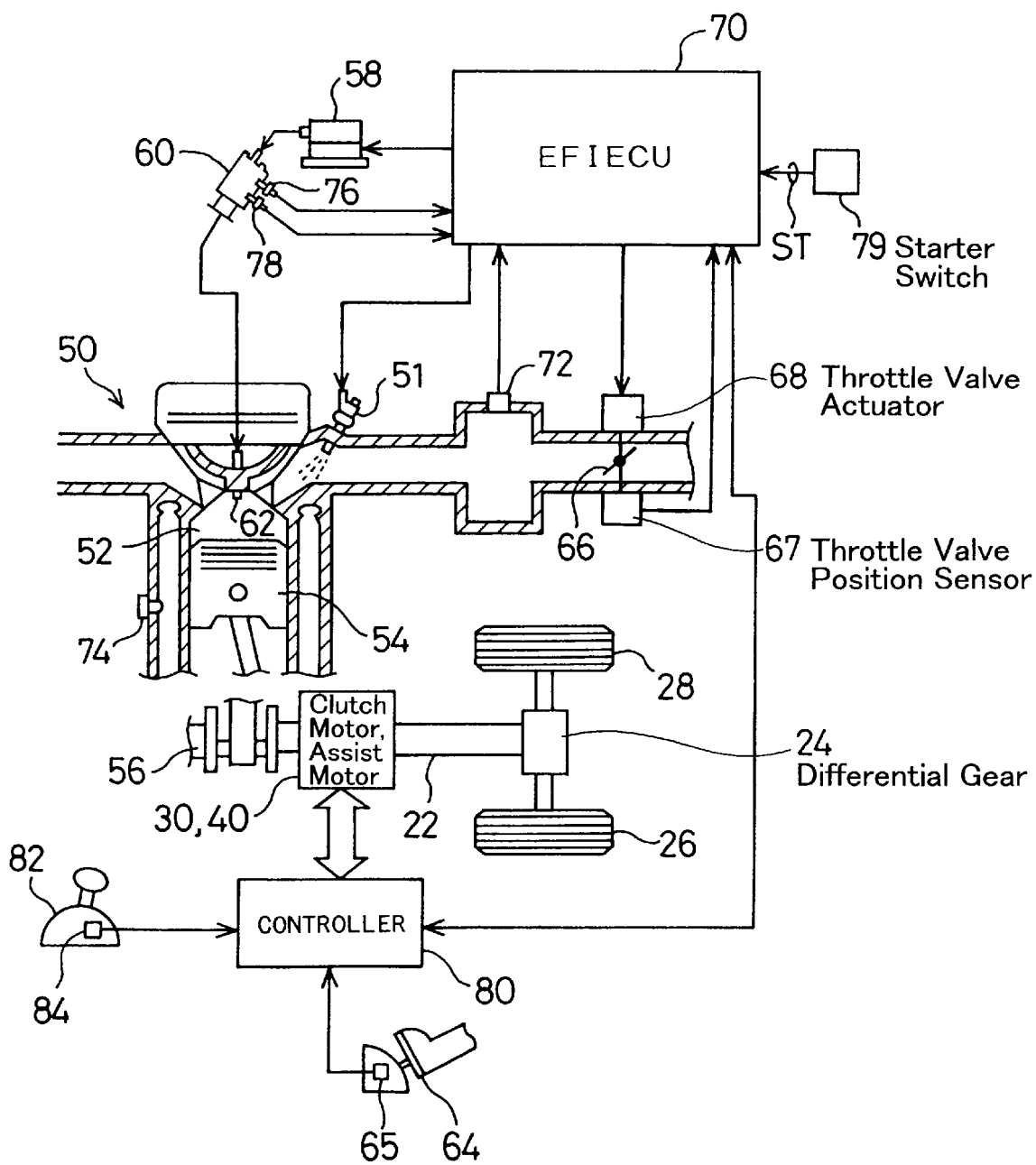
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle has a gasoline engine 50 driven by gasoline as a power source or a prime mover. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by a motor 68. An ignition plug 62 converts a high voltage applied from an igniter 58 via a distributor 60 to a spark, which explosively ignites and combusts the air/fuel mixture.

Operation of the gasoline engine 50 is controlled by an electronic control unit (hereinafter referred to as EFIECU) 70. The EFIECU 70 receives information from various sensors, which detect operating conditions of the gasoline engine 50. These sensors include a throttle position sensor 67 for detecting the valve travel or the position of the throttle valve 66, a manifold vacuum sensor 72 for measuring a load applied to the gasoline engine 50, a water temperature sensor 74 for measuring the temperature of cooling water in the gasoline engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the gasoline engine 50 is linked with a drive shaft 22 via a clutch motor 30 and an assist motor 40. The drive shaft 22 further connects with a differential gear 24, which eventually transmits the torque output from the drive shaft 22 to left and right driving wheels 26 and 28. The clutch motor 30 and the assist motor 40 are driven and controlled by a controller 80. The controller 80 includes an internal control CPu and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the gasoline engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the gasoline engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle Od of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the gasoline engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the gasoline engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The following describes the essential operation of the power output apparatus 20 thus constructed. Described first is the operation when the vehicle is driven in normal state, that is, when the drive shaft 22 is rotated at a lower revolving speed than that of the crankshaft 56 of the gasoline engine 50. By way of example, it is assumed that the gasoline engine 50 driven by the EFIECU 70 rotates at a predetermined revolving speed Ne. The drive shaft 22 is rotated at a revolving speed Nd which is lower than the predetermined engine speed Ne (Nd<Ne). As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between a revolving speed Ne of the crankshaft 56 of the gasoline engine 50 and the revolving speed Nd of the drive shaft 22 (that is, difference Nc (=Ne−Nd) between the revolving speed of the outer rotor 32 and that of the inner rotor 34 in the clutch motor 30). A certain slip accordingly exists between the outer rotor 32 and the inner rotor 34 of the clutch motor 30. This means that the inner rotor 34 is rotated in the direction of rotation of the crankshaft 56 at a revolving speed lower than that of the crankshaft 56 of the gasoline engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
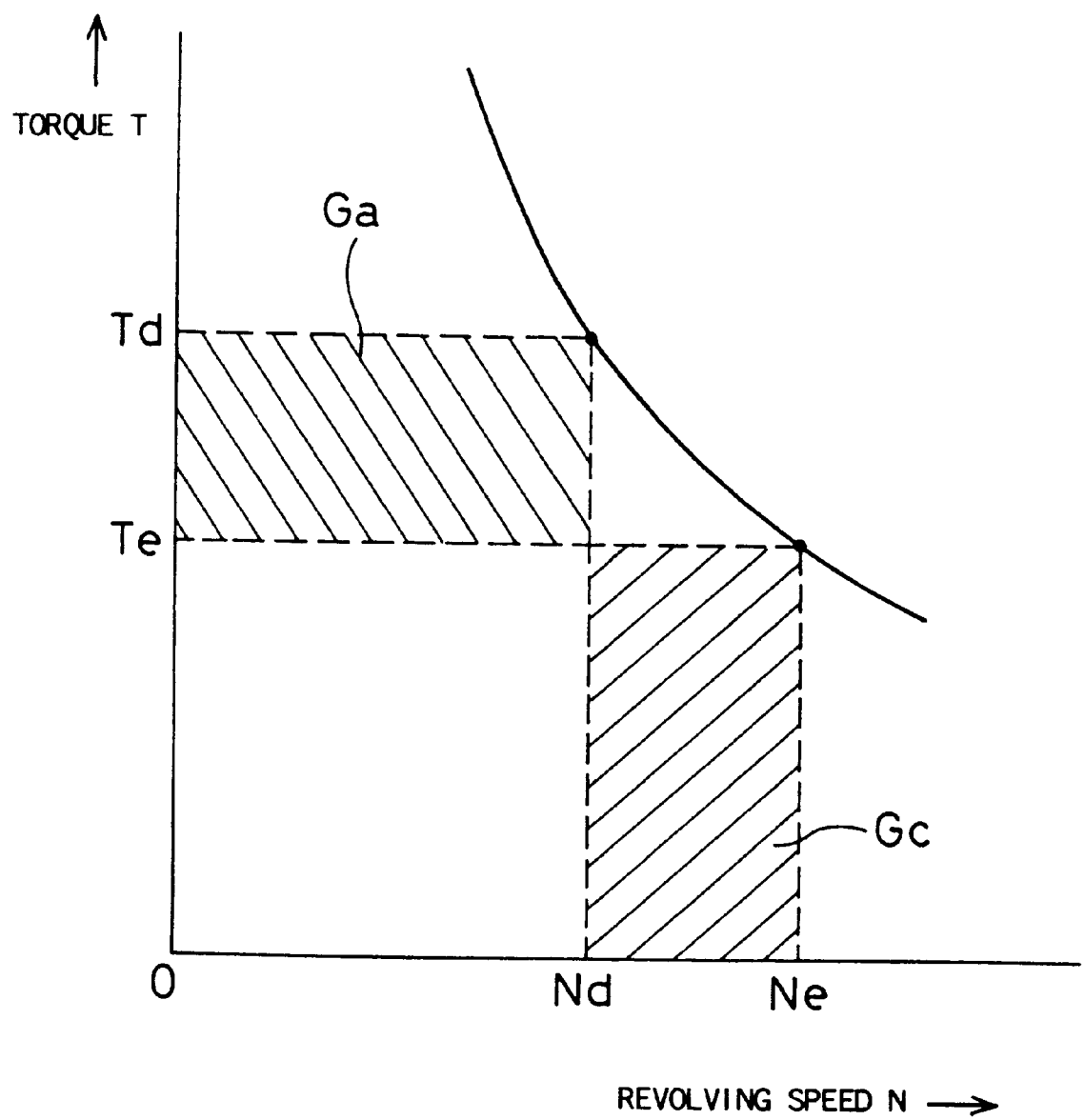
FIG. 4 is a graph schematically illustrating an amount of energy regenerated by the clutch motor 30 and that consumed by the assist motor 40.

FIG. 4 is a graph schematically illustrating an amount of energy regenerated by the clutch motor 30 and that consumed by the assist motor 40. While the crankshaft 56 of the gasoline engine 50 is driven at a revolving speed Ne and a torque Te, energy in a region Gc is regenerated as electric power by the clutch motor 30. The regenerated power is supplied to the assist motor 40 and converted to energy in a region Ga, which enables the drive shaft 22 to rotate at a revolving speed Nd and a torque Td. The torque conversion is carried out in the manner discussed above, and the energy corresponding to the slip in the clutch motor 30 or the revolving speed difference (Ne−Nd) is consequently given as a torque to the drive shaft 22.

The following describes the operation when the vehicle is driven at high speed on the free way or highway, that is, when the drive shaft 22 is rotated at a revolving speed higher than that of the crankshaft 56 of the gasoline engine 50 (in the overdrive state). The gasoline engine 50 is generally controlled to be driven at the possible highest efficiency. The revolving speed Ne of the crankshaft 56 of the gasoline engine 50 is accordingly restricted to a high-efficiency speed range. While the increased revolving speed Nd of the drive shaft 22 can exceed a maximum value Nemax in the high-efficiency speed range of the gasoline engine 50, the revolving speed Ne of the crankshaft 56 can not exceed the maximum value Nemax of the high-efficiency speed range. Therefore, when the revolving speed Nd of the drive shaft 22 exceeds the maximum value Nemax of the high-efficiency speed range, the revolving speed Nd of the drive shaft 22 becomes higher than the revolving speed Ne of the crankshaft 56. Namely the vehicle is driven in the overdrive state.

When the control CPU 90 of the controller 80 outputs the first control signal SW1 to control on and off the transistors Tr1 through Tr6 in the first driving circuit 91 under the overdrive condition, the clutch motor 30 functions as a normal motor and carries out the power operation to enhance the speed of rotation of the inner rotor 34 relative to the outer rotor 32. This enables the drive shaft 22 to be kept rotating at the higher revolving speed Nd than the revolving speed Ne of the gasoline engine 50. While functioning as a normal motor, the clutch motor 30 consumes the electrical energy.

In order to allow the assist motor 40 to regenerate energy identical with the electrical energy consumed by the clutch motor 30, the control CPU 90 controls on and off the transistors Tr11 through Tr16 in the second driving circuit 92. The on-off control of the transistors Tr11 through Tr16 enables the assist motor 40 to carry out the regenerative operation. An electric current thus flows through the three-phase coils 44 of the assist motor 40, and electric power is consequently regenerated via the second driving circuit 92. The regenerated power is supplied to the clutch motor 30 as electrical energy, which makes up for the electrical energy consumed by the clutch motor 30.

Figure 5:
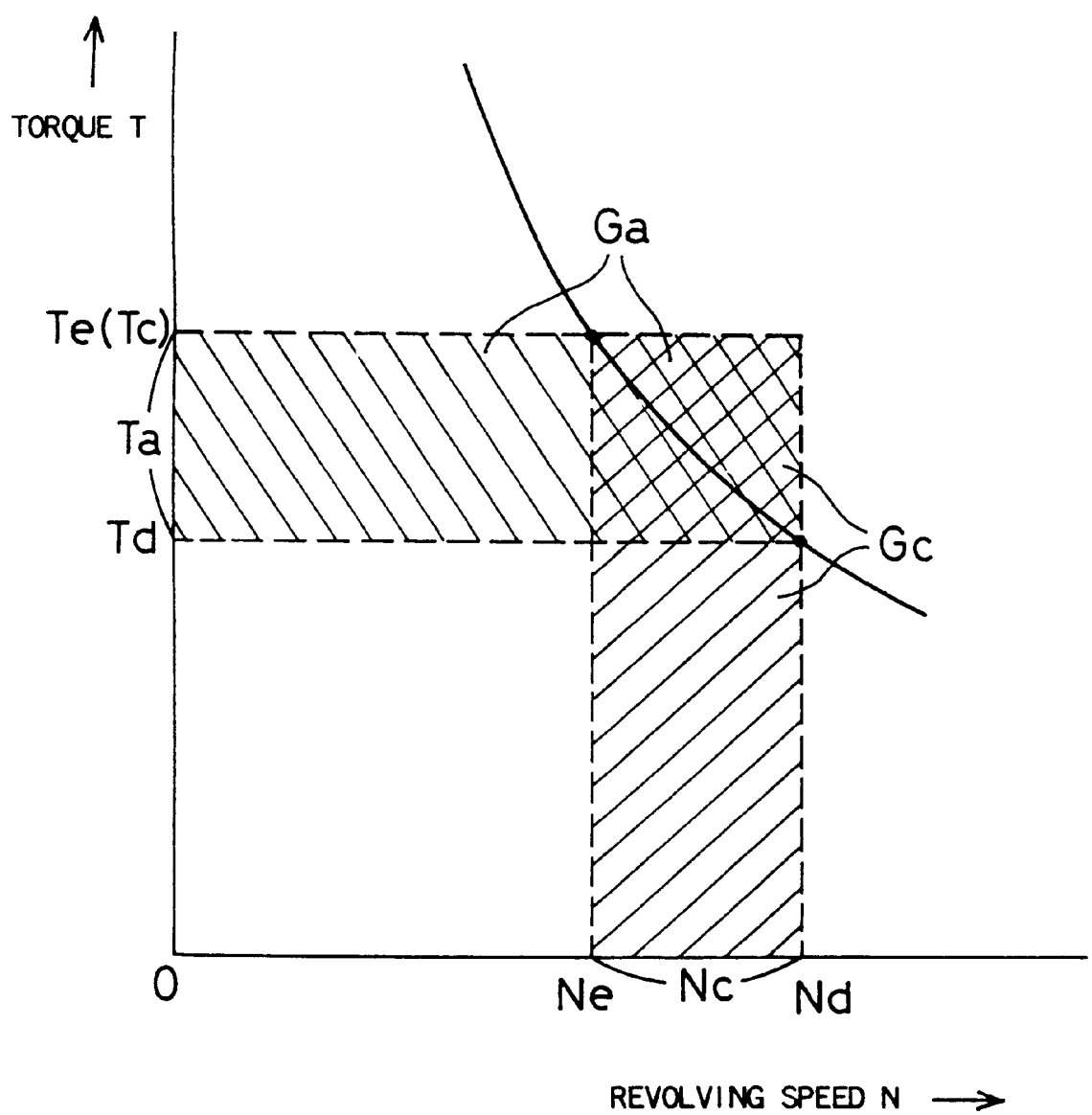
FIG. 5 is a graph schematically illustrating an amount of energy consumed by the clutch motor 30 and that regenerated by the assist motor 40 in the overdrive state.

FIG. 5 is a graph schematically illustrating an amount of energy consumed by the clutch motor 30 and that regenerated by the assist motor 40 in the overdrive state. By way of example, it is assumed that the crankshaft 56 of the gasoline engine 50 is driven at a revolving speed Ne and a torque Te and that the drive shaft 22 is rotated at a revolving speed Nd and a torque Td. In this state, energy in a region Ga is regenerated as electric power by the assist motor 40. The regenerated power is supplied to the clutch motor 30 and converted to energy in a region Gc, which is eventually consumed by the clutch motor 30. With a decrease in torque Td of the drive shaft 22 (that is, output torque) against the torque Te of the gasoline engine 50, the revolving speed Nd of the drive shaft 22 increases against the revolving speed Ne of the gasoline engine 50 (that is, the revolving speed of the crankshaft 56). In the graph of FIG. 5, Ta represents the torque of the assist motor 40, and Tc and Nc denote the torque and revolving speed of the clutch motor 30.

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the gasoline engine 50 (that is, the product of the torque Te and the revolving speed Ne), the electrical energy regenerated or consumed by the clutch motor 30, and the electrical energy regenerated or consumed by the assist motor 40. The output energy from the gasoline engine 50 can thus be transmitted as power to the drive shaft 22 at a higher efficiency.

Figure 6:
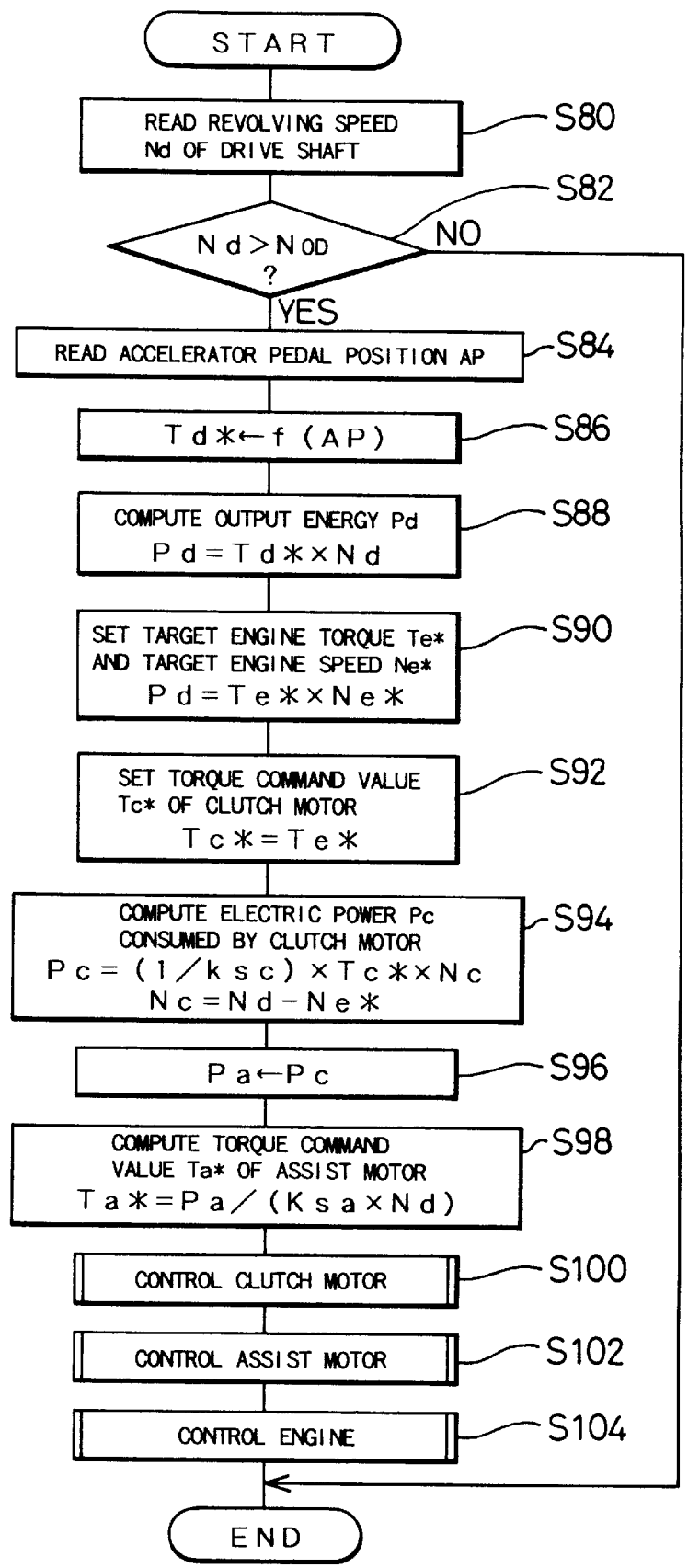
FIG. 6 is a flowchart showing a control process in the overdrive state executed by the control CPU 90.

The following describes the control procedure of the controller 80 when the drive shaft 22 is rotated at a revolving speed higher than that of the crankshaft 56 of the gasoline engine 50 (that is, in the overdrive state). FIG. 6 is a flowchart showing a control process in the overdrive state executed by the control CPU 90. When the program enters the routine, the control CPU 90 first receives data of revolving speed Nd of the drive shaft 22 at step S80. The revolving speed Nd of the drive shaft 22 can be computed from the rotational angle θd of the drive shaft 22 read from the resolver 48.

The input revolving speed Nd of the drive shaft 22 is compared with a reference speed NOD for overdrive operation at step S82. When the input revolving speed Nd exceeds the reference speed NOD, the program proceeds to subsequent step S84. Otherwise, the program exits from the routine of FIG. 6. The reference speed NOD for overdrive operation is, for example, set equal to the maximum value Nemax in the high-efficiency speed range of the gasoline engine 50.

At step S84, the control CPU 90 reads the accelerator pedal position AP from the accelerator position sensor 65. The driver steps on the accelerator pedal 64 when feeling insufficiency of output torque. The value of the accelerator pedal position AP accordingly represents the desired output torque (that is, torque of the drive shaft 22) which the driver requires. At subsequent step S86, the control CPU 90 computes a target output torque (torque of the drive shaft 22) $Td^*$ corresponding to the input accelerator pedal position AP. The target output torque $Td^*$ is also referred to as the output torque command value. Output torque command values $Td^*$ have been set previously for the respective accelerator pedal positions AP. In response to an input of the accelerator pedal position AP, the output torque command value $Td^*$ corresponding to the input accelerator pedal position AP is extracted from the preset output torque command values $Td^*$.

At step S88, an amount of energy Pd to be output from the drive shaft 22 is calculated according to the expression $Pd=Td^* \times Nd$, that is, multiplying the extracted output torque command value $Td^*$ (of the drive shaft 22) by the input revolving speed Nd of the drive shaft 22. The program then proceeds to step S90 at which the control CPU 90 sets a target engine torque $Te^*$ and a target engine speed $Ne^*$ of the gasoline engine 50 based on the output energy Pd thus obtained. Here it is assumed that all the energy Pd to be output from the drive shaft 22 is supplied by the gasoline engine 50. Since the mechanical energy supplied from the gasoline engine 50 is equal to the product of the torque Te and the revolving speed Ne of the gasoline engine 50, the relationship between the output energy Pd and the target engine torque $Te^*$ and the target engine speed $Ne^*$ can be expressed as $Pd=Te^* \times Ne^*$. There are, however, numerous combinations of the target engine torque $Te^*$ and the target engine speed $Ne^*$ satisfying the above relationship. In this embodiment, an optimal combination of the target engine torque $Te^*$ and the target engine speed $Ne^*$ is selected in order to realize operation of the gasoline engine 50 at the possible highest efficiency. The target engine speed (revolving speed of the crankshaft 56) $Ne^*$ is accordingly set within the high-efficiency speed range of the gasoline engine 50.

This means that the target engine speed (revolving speed of the crankshaft 56) $Ne^*$ can not exceed the maximum value Nemax in the high-efficiency speed range of the gasoline engine 50. The reference speed NOD for overdrive operation is set equal to the maximum value Nemax of the high-efficiency speed range as mentioned above. When the revolving speed Nd of the drive shaft 22 exceeds the reference speed NOD, the revolving speed Nd of the drive shaft 22 is always higher than the engine speed (revolving speed of the crankshaft 56 of the gasoline engine 50) Ne. Namely, the vehicle is in the overdrive state.

At subsequent step S92, the control CPU 90 determines a torque command value Tc* of the clutch motor 30 based on the target engine torque Te* set at step S90. In order to keep the revolving speed Ne of the gasoline engine 50 at a substantially constant level, it is required to make the torque of the clutch motor 30 balance the torque of the gasoline engine 50. The processing at step S92 accordingly sets the torque command value Tc* of the clutch motor 30 equal to the target engine torque Te*.

The control CPU 90 calculates electric power Pc consumed by the clutch motor 30 at step S94. The electric power Pc consumed by the clutch motor 30 is calculated from the torque command value Tc* of the clutch motor 30 set at step S92 and is expressed as:

$$Pc = (1/ksc) \times Tc^* \times Nc$$

wherein ksc represents an efficiency of power operation by the clutch motor 30 and Nc denotes a revolving speed of the clutch motor 30. The revolving speed Nc of the clutch motor 30 is equal to the difference between the revolving speed of the drive shaft 22 and that of the crankshaft 56, and can thus be expressed as:

$$Nc = Nd - Ne^*$$

wherein Nd is the revolving speed of the drive shaft 22 read at step S80 and Ne* is the target engine speed set at step S90.

On the assumption that all the power Pc consumed by the clutch motor 30 is covered by the regenerative power of the assist motor 40, electric power Pa regenerated by the assist motor 40 is set equal to the power Pc consumed by the clutch motor 30 at step S96.

At subsequent step S98, a torque command value Ta* of the assist motor 40 is calculated from the revolving speed Nd of the drive shaft 22 read at step S80 and the regenerative power Pa of the assist motor 40 set at step S96. The torque command value Ta* is expressed as:

$$Ta^* = Pa/(Ksa \times Nd)$$

wherein Ksa denotes an efficiency of regeneration by the assist motor 40.

After determining the torque command value Ta* of the assist motor 40, the program proceeds to steps S100, S102, and S104 to control the clutch motor 30, the assist motor 40, and the gasoline engine 50, respectively. As a matter of convenience of illustration, the control operations of the clutch motor 30, the assist motor 40, and the gasoline engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to control the gasoline engine 50 concurrently.

Figure 7:
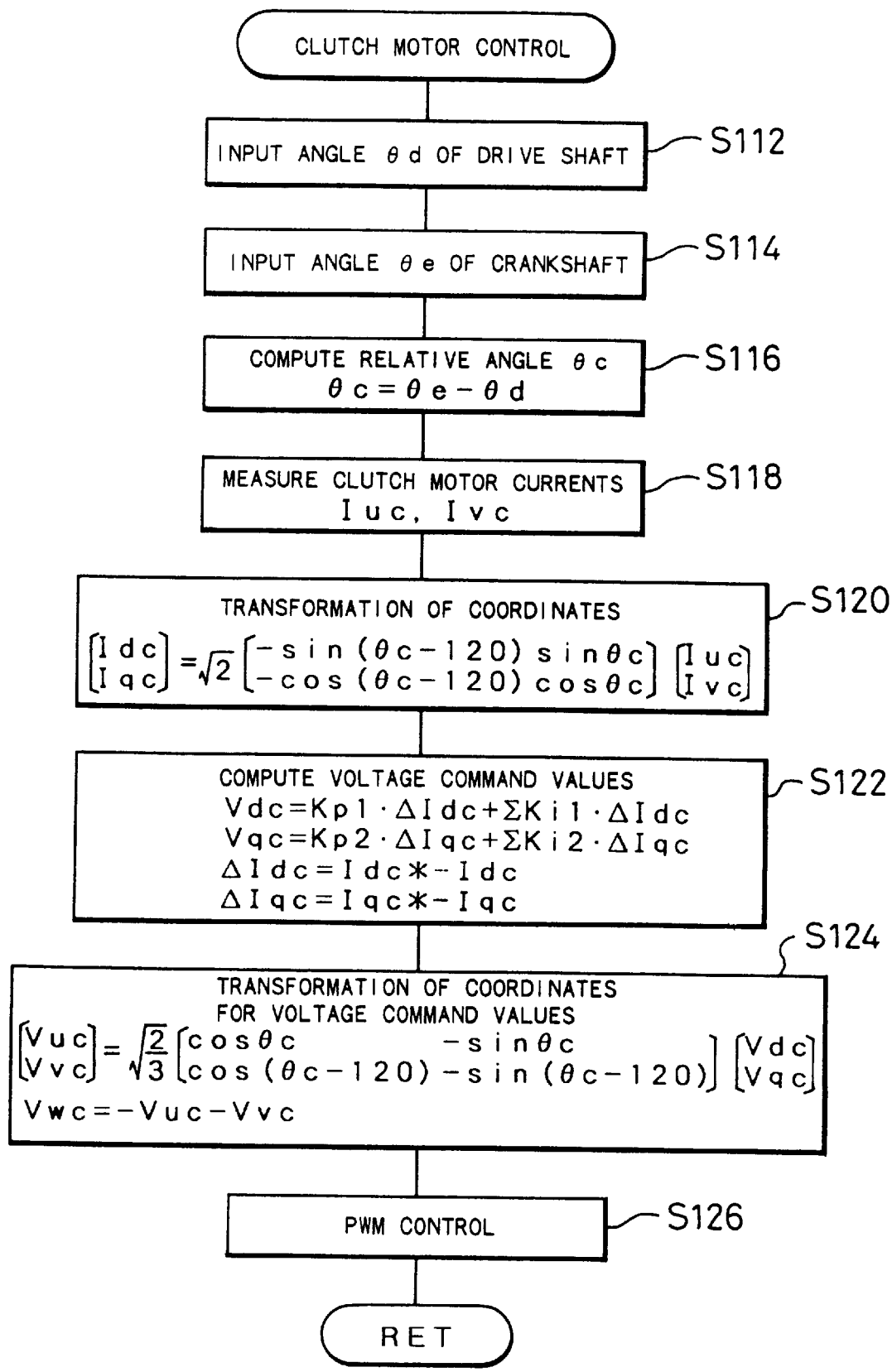
FIG. 7 is a flowchart showing details of the control process of the clutch motor 30 executed at step S100 in the he flowchart of FIG. 6.

FIG. 7 is a flowchart showing details of the control process of the clutch motor 30 executed at step S100 in the flowchart of FIG. 6. When the program enters the clutch motor control routine, the control CPU 90 of the controller 80 first reads the rotational angle θd of the drive shaft 22 from the resolver 48 at step S112 and the rotational angle θe of the crankshaft 56 of the gasoline engine 50 from the resolver 39 at step S114. The control CPU 90 then computes a relative angle θc of the drive shaft 22 and the crankshaft 56 by the equation θc=θe−θd at step S116.

The program proceeds to step S118, at which the control CPU 90 receives data of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin \theta c \\ -\cos(\theta c - 120) & \cos \theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* \times Idc$$
$$\Delta Iqc = Iqc^* - Iqc \quad (2)$$
$$Vdc = Kp1 \cdot \Delta Idc + \Sigma Ki1 \cdot \Delta Idc$$
$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (vqc) includes a part in proportion to the deviation ΔI from the current command value I* (first term in right side of Equation (3)) and a summation of historical data of the deviations ΔI for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos \theta c & -\sin \theta c \\ \cos(\theta c - 120) & -\sin(\theta c - 120) \end{bmatrix} \begin{bmatrix} Vdc \\ Vqc \end{bmatrix}$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values vuc, Vvc, and Vwc determined by Equation (4) above. This process enables the clutch motor 30 to mechanically transmit the target torque to the drive shaft 22.

Figure 8:
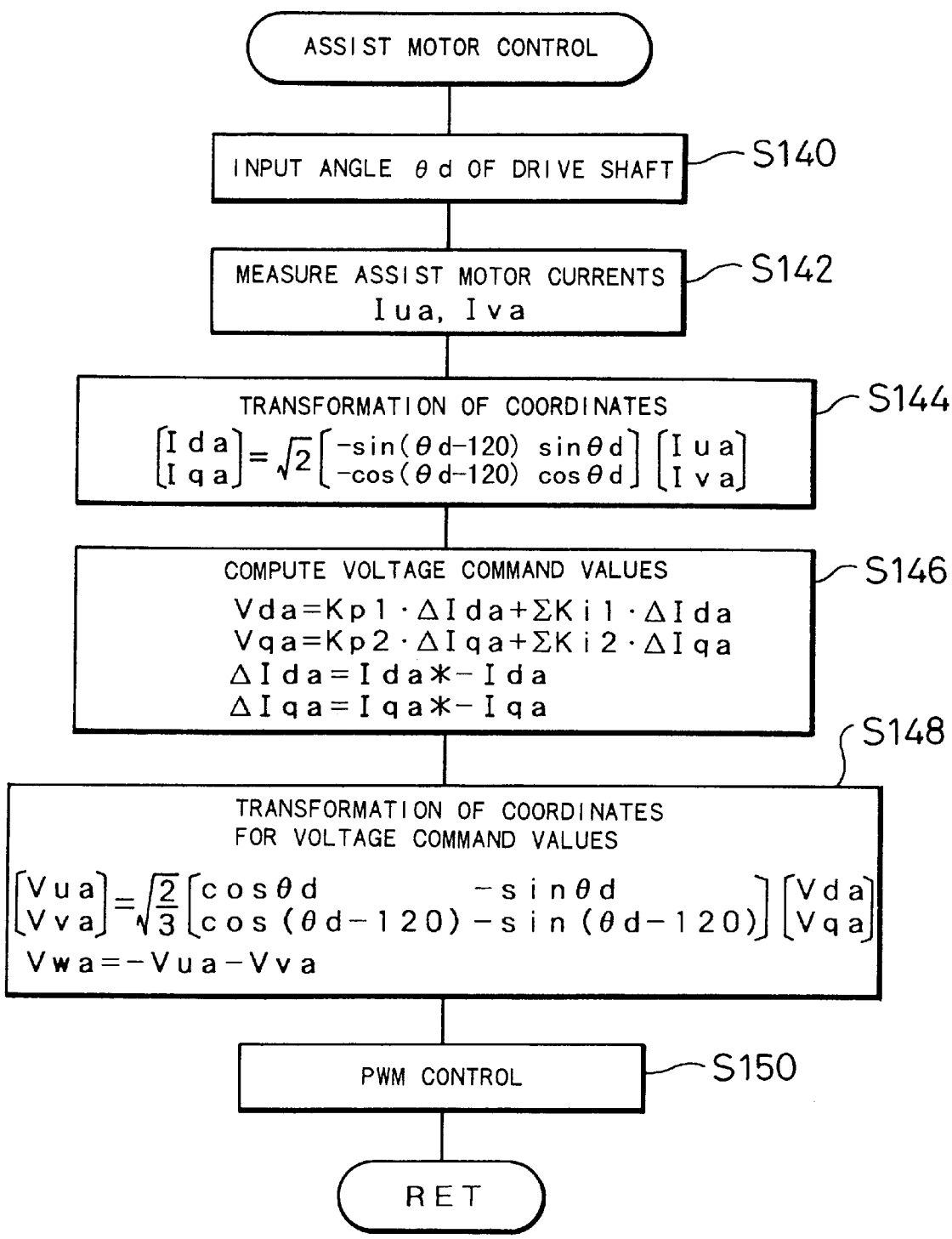
FIG. 8 is a flowchart showing details of the control process of the assist motor 40 executed at step S102 in the flowchart of FIG. 6.

FIG. 8 is a flowchart showing details of the control process of the assist motor 40 executed at step S102 in the flowchart of FIG. 6. When the program enters the assist motor control routine, the control CPU 90 first reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. The control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 7.

The control of the gasoline engine 50 (step S104 in the flowchart of FIG. 6) is executed in the following manner. In order to attain stationary driving at the target engine torque Te* and the target engine speed Ne* (set at step S90 in FIG. 6), the control CPU 90 regulates the torque Te and the revolving speed Ne of the gasoline engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the gasoline engine 50 eventually approach the target engine torque Te* and the target engine speed Ne*.

As discussed above, the power, operation of the clutch motor 30 enables the drive shaft 22 to rotate at a revolving speed higher than that of the crankshaft 56 of the gasoline engine 50. In the meantime, the assist motor 40 carries out the regenerative operation to regenerate electric power, which is supplied to the clutch motor 30 to make up for the electric power consumed by the clutch motor 30. As shown in FIG. 5, the energy in the region Ga regenerated as electric power by the assist motor 40 is consumed as the energy in the region Gc by the clutch motor 30. Namely the energy in the region Ga is converted to that in the region Gc.

There is naturally a certain amount of energy loss in the clutch motor 30, the assist motor 40, the first driving circuit 91, and the second driving circuit 92. It is accordingly rare that the energy in the region Ga perfectly coincides with the energy in the region Gc in the actual state. The energy loss in the clutch motor 30 and the assist motor 40 is, however, relatively small since some synchronous motors recently developed have an efficiency very close to 1. The energy loss in the first driving circuit 91 and the second driving circuit 92 can also be sufficiently small since the ON-state resistance of known transistors, such as GTOs, applicable to Tr1 through Tr16 is extremely small.

While the clutch motor 30 applies the torque Tc to the drive shaft 22, the assist motor 40 produces the torque Ta acting in the reverse of rotation of the drive shaft 22. The torque Td output from the drive shaft 22 is consequently equal to (Tc−Ta). When the vehicle is driven steadily at high speed on the free way or highway, a large torque is generally not required for the output torque Td of the drive shaft 22 because of the inertia of the vehicle. No problem thus arises even when the output torque Td is as small as (Tc−Ta). As described previously, in order to keep the revolving speed Ne of the gasoline engine 50 at a substantially constant level, the torque Tc of the clutch motor 30 is set equal to the torque Te of the gasoline engine 50.

Figure 9A:
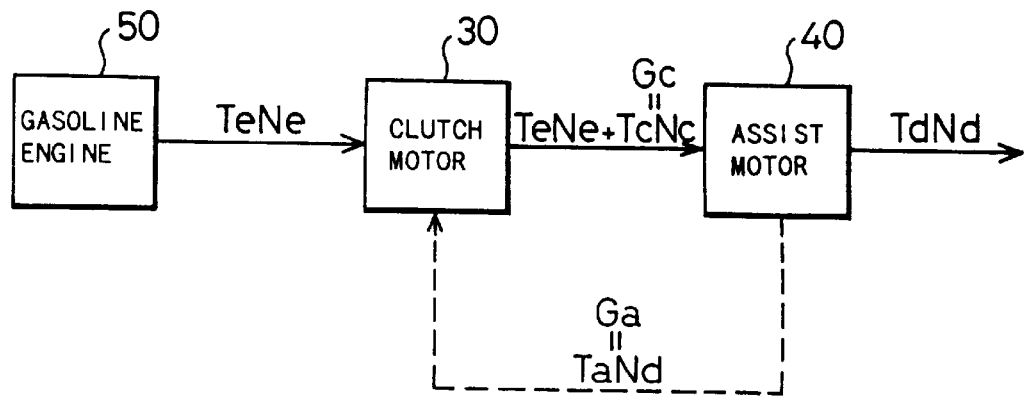
FIGS. 9(a) through 9(c) show a flow of energy between the gasoline engine 50, the clutch motor 30, the assist motor 40 and the battery 94.

FIG. 9(a) shows a flow of energy between the gasoline engine 50, the clutch motor 30, and the assist motor 40. In FIG. 9, the arrow of the solid line shows a flow of mechanical energy and the arrow of the broken line shows a flow of electrical energy.

As shown in FIG. 9(a), mechanical energy (Te×Ne) produced by the gasoline engine 50 is transmitted to the clutch motor 30. The clutch motor 30 also receives electrical energy in the region Ga (Ta×Nd) supplied from the assist motor 40 and converts the electrical energy (Ta×Nd) to mechanical energy in the region Gc (Tc×Nc). Accordingly the sum of the mechanical energy (Tc×Nc) and the mechanical energy (Te×Ne) transmitted from the gasoline engine 50 is transmitted from the clutch motor 30 to the assist motor 40. The assist motor 40 converts part of the transmitted mechanical energy to electrical energy in the region Ga (Ta×Nd) and supplies the electrical energy (Ta×Nd) to the clutch motor 30. The remainder (Td×Nd) of the transmitted mechanical energy is output to the drive shaft 22.

The structure of the first embodiment allows the drive shaft 22 to rotate at a revolving speed higher than that of the crankshaft 56 of the gasoline engine 50, that is, makes the vehicle driven in the overdrive state. This enables the gasoline engine 50 to be driven at a desired high efficiency without increasing the revolving speed of the gasoline engine 50 (revolving speed of the crankshaft 56) even under the condition of high-speed driving, thereby improving the fuel consumption.

Figure 9B:
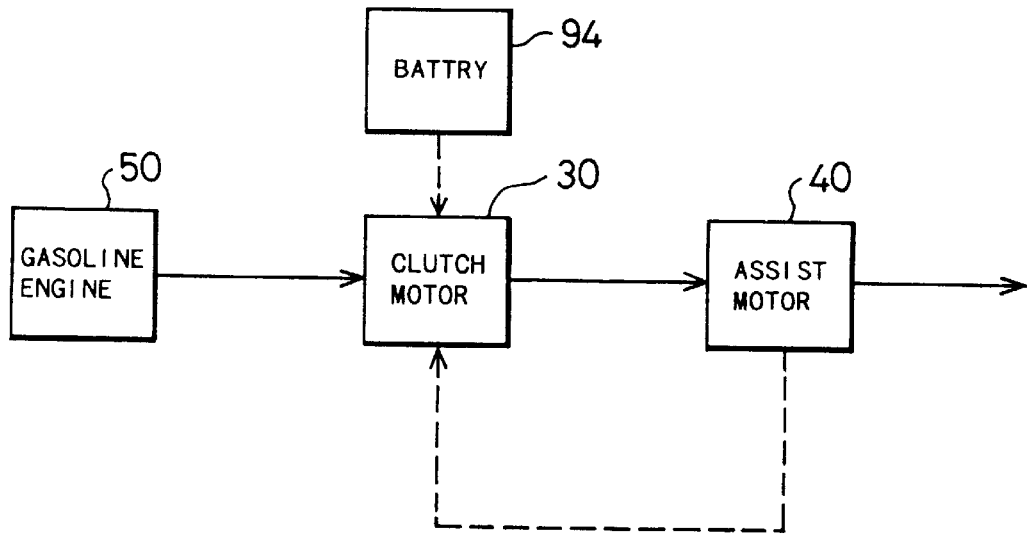

In the first embodiment described above, only the electric power regenerated by the assist motor 40 is used for the power operation of the clutch motor 30 to realize the overdrive state. The electric power stored in the battery 94 included in the power output apparatus 20 may also be used for the same purpose. When the battery 94 has a sufficient residual capacity, the control CPU 90 of the controller 80 enables the clutch motor 30 to implement the power operation using the electric power stored in the battery 94 as well as the electric power regenerated by the assist motor 40. In accordance with a concrete procedure, the control CPU 90 controls the first driving circuit 91 to allow both the electric power regenerated by the assist motor 40 and that stored in the battery 94 to be supplied to the clutch motor 30 via the first driving circuit 91. The clutch motor 30 carries out the power operation with the greater amount of electric power, thereby further increasing the revolving speed of the drive shaft 22. In this case, a flow of energy between the gasoline engine 50, the clutch motor 30, the assist motor 40 and the battery 94 is as shown in FIG. 9(b).

Figure 9C:
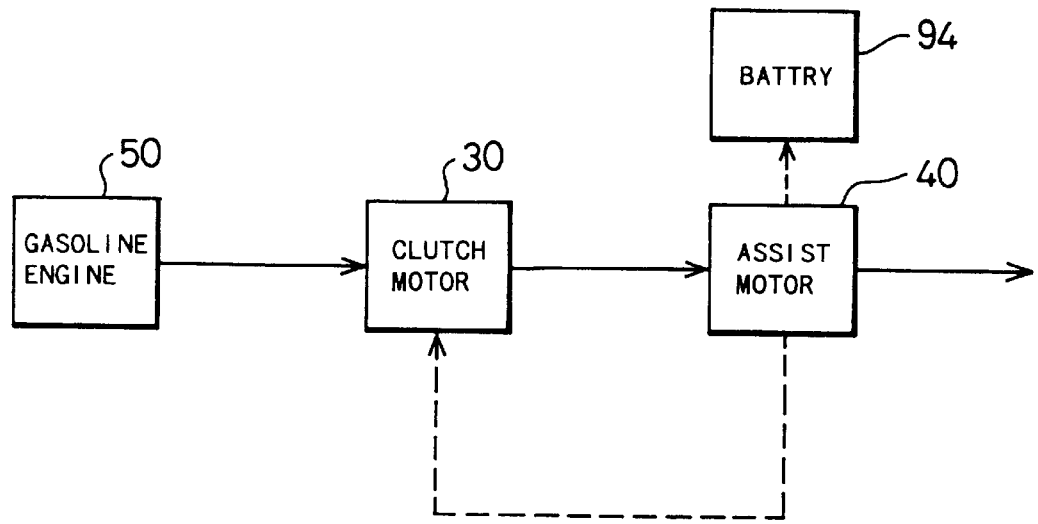

When the battery 94 has very little residual capacity, on the other hand, the assist motor 40 may be controlled to regenerate electric power which is greater than the electric power consumed by the clutch motor 30. In this structure, while part of the electric power regenerated by the assist motor 40 is supplied to the clutch motor 30, the battery 94 is charged with the remaining regenerated power. In accordance with a concrete procedure, the control CPU 90 controls the first and the second driving circuits 91 and 92 to charge the battery 94 with part of the electric power regenerated by the assist motor 40. This structure enables the battery 94 to be charged with the remaining power during the overdrive operation. In this case, a flow of energy between the gasoline engine 50, the clutch motor 30, the assist motor 40 and the battery 94 is as shown in FIG. 9(c).

When the battery 94 has been fully charged, on the contrary, further storage of electric charges into the battery 94 may cause a trouble. Under such a condition, it is preferable that the assist motor 40 is controlled not to carry out any further regenerative operation whereas the clutch motor 30 is controlled to carry out the power operation only with the electric power stored in the battery 94. In accordance with a concrete procedure, the control CPU 90 controls the second driving circuit 92 to interfere with the regenerative operation of the assist motor 40, while controlling the first driving circuit 91 to allow supply of the electric power stored in the battery 94 to the clutch motor 30 via the first driving circuit 91 and realize the power operation of the clutch motor 30 with the electric power thus supplied. This operation can reduce the residual capacity of the battery 94 to an appropriate level.

The control CPU 90 determines the charging condition of the battery 94 based on the residual capacity BRM of the battery 94 measured by the residual capacity meter 99.

The power output apparatus 20 of the first embodiment can go into another application given as a second embodiment of the present invention. The second embodiment carries out the overdrive control to exert the similar effects to those of the conventional overdrive operation by the torque converter.

Figure 10:
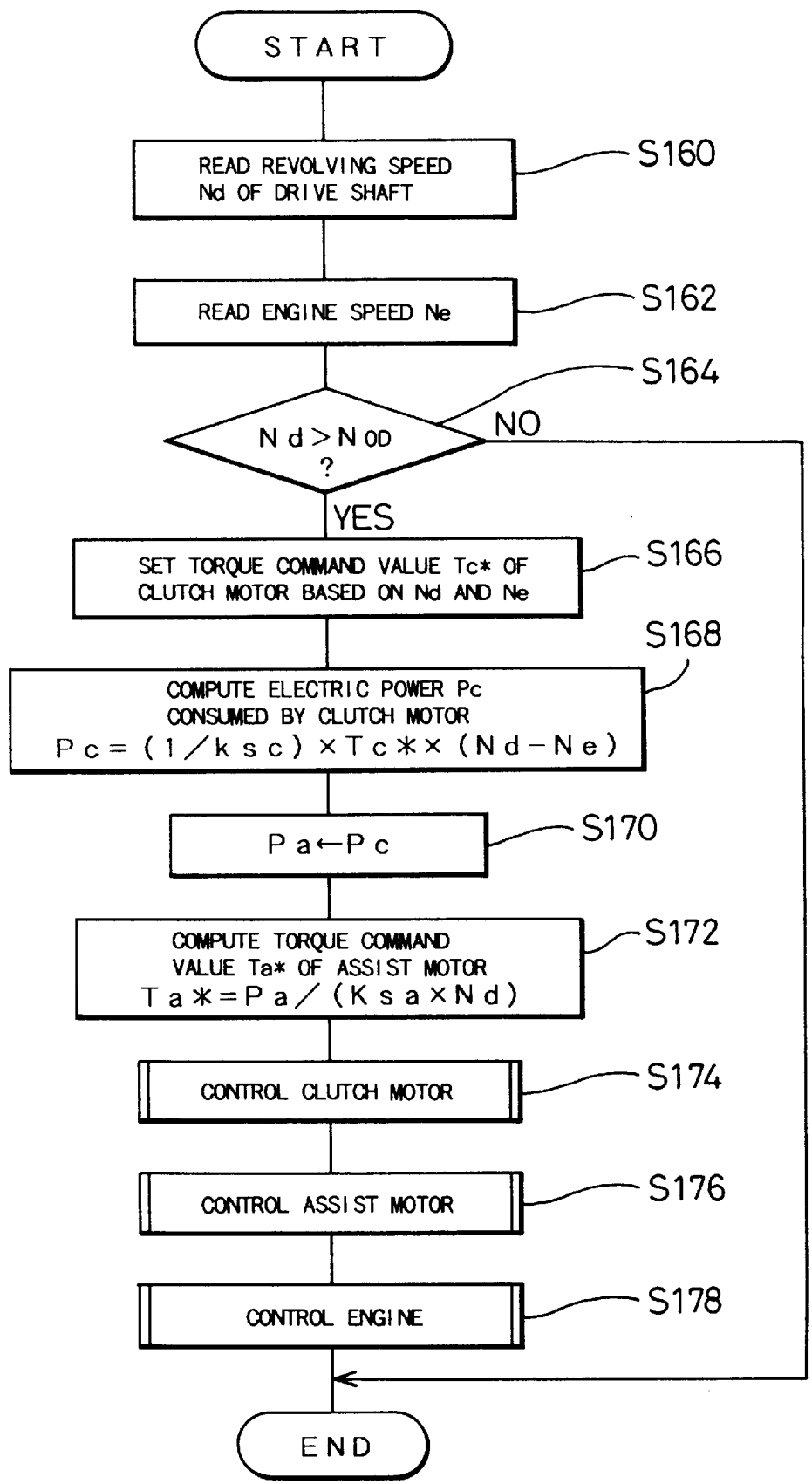
FIG. 10 is a flowchart showing a control process in the overdrive state executed by the control CPU 90 in a second embodiment of the present invention.

FIG. 10 is a flowchart showing a control process in the overdrive state executed by the control CPU 90 in the second embodiment. When the program enters the routine, the control CPU 90 of the controller 80 first receives data of revolving speed Nd of the drive shaft 22 at step S160 and data of revolving speed Ne of the gasoline engine 50 at step S162. The revolving speed Ne of the gasoline engine 50 may be computed from the rotational angle θe of the crankshaft 56 read from the resolver 39 or directly measured by the speed sensor 76 mounted on the distributor 60. In the latter case, the control CPU 90 receives data of revolving speed Ne of the gasoline engine 50 through communication with the EFIECU 70, which connects with the speed sensor 76.

The revolving speed Nd of the drive shaft 22 read at step S160 is compared with a reference speed NOD for overdrive operation at step S164. When the input revolving speed Nd exceeds the reference speed NOD, the program proceeds to subsequent step S166. Otherwise, the program exits from the routine of FIG. 10.

At step S166, the control CPU 90 determines the torque command value Tc* of the clutch motor 30 according to the revolving speed Nd of the drive shaft 22 read at step S160 and the revolving speed Ne of the gasoline engine 50 read at step S162. The torque command value Tc* of the clutch motor 30 may be determined according to one of the characteristic curves previously stored in the ROM 90b as illustrated in FIG. 11 or alternatively by the calculation.

Figure 11:
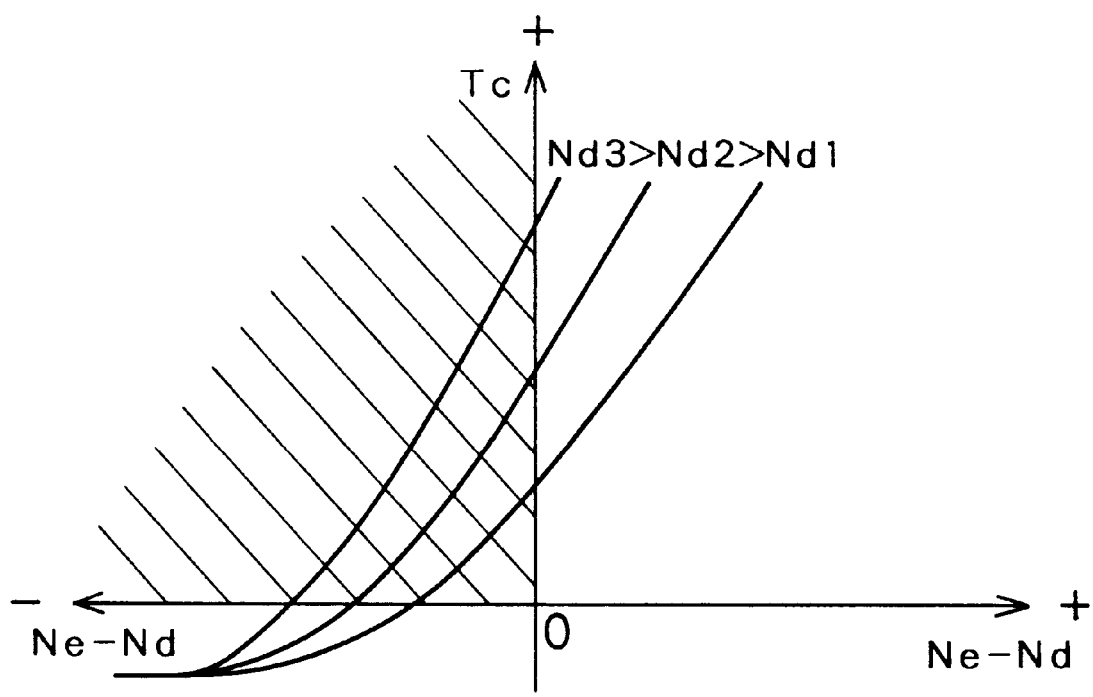
FIG. 11 is a characteristic diagram showing the torque Tc of the clutch motor 30 plotted against the revolving speed difference (Ne-Nd) for different values of revolving speed Nd.

In the former method, a plurality of characteristic curves representing the relationship between the revolving speed difference (Ne−Nd) and the torque Tc of the clutch motor 30 are prepared for different values of the revolving speed Nd of the drive shaft 22 as shown in FIG. 11. An appropriate characteristic curve corresponding to the input revolving speed Nd of the drive shaft 22 is selected among those previously stored in the ROM 90b. The torque command value Tc* of the clutch motor 30 is then read against the revolving speed difference (Ne−Nd) in the selected characteristic curve. The characteristic curves applicable to the overdrive control are those in the second quadrant (filled with slant lines) in FIG. 11.

In the latter method, for example, Equation (5) given below is used for the calculation:

$$Tc = Kc\{(Ne-Nd) + Kdd \times Nd\} \quad (5)$$

wherein Kc denotes an efficiency corresponding to the slope of the curve in the graph of FIG. 11, and Kdd represents a constant corresponding to the coefficient for determining the ordinate's intersection of the curve with respect to a given revolving speed Nd.

The processing executed at subsequent steps S168 through S178 is identical with that executed at steps S94 through S104 of FIG. 6 in the first embodiment.

As discussed above, the overdrive control of the second embodiment determines the torque command value Tc* of the clutch motor 30 based on the input data of revolving speed Nd of the drive shaft 22 and revolving speed Ne of the gasoline engine 50 according to the characteristic curves as illustrated in FIG. 11 or by the calculation of Equation (5) given above.

By way of example, it is assumed that the vehicle is driven at a constant speed and the drive shaft 22 is rotated at a constant revolving speed Nd (for example, Nd=Nd3 in FIG. 11). When the driver steps on the accelerator pedal 64 to enhance the output torque (torque of the drive shaft 22) in order to increase the vehicle speed, the gasoline engine 50 is controlled to increase its revolving speed Ne. The difference (Ne−Nd) between the revolving speed Nd of the drive shaft 22 and the revolving speed Ne of the gasoline engine 50 accordingly approaches to zero. Since the characteristic curve of the given revolving speed Nd3 has a positive gradient as clearly seen in FIG. 11, the clutch motor 30 is controlled to increase its torque Tc as the revolving speed difference (Ne−Nd) becomes closer to zero. This means that a large value is set to the torque command value Tc*. With an increase in torque Tc of the clutch motor 30, the drive shaft 22 is driven to rotate more rapidly relative to the crankshaft 56 of the gasoline engine 50. This increases the revolving speed Nd of the drive shaft 22 and accordingly enhances the vehicle speed. The increase in revolving speed Nd makes the revolving speed difference (Ne−Nd) away from zero, so that the clutch motor 30 is controlled to decrease its torque Tc. This means that a small value is set to the torque command value Tc*. The structure of the second embodiment determines the torque command value Tc* of the clutch motor 30 in the above manner, thus realizing the continuous overdrive control.

When the driver does not require an increase in output torque (torque of the drive shaft 22) and releases the accelerator pedal 64, on the contrary, the gasoline engine 50 is controlled to decrease its revolving speed Ne. The difference (Ne−Nd) between the revolving speed Nd of the drive shaft 22 and the revolving speed Ne of the gasoline engine 50 accordingly becomes more distant from zero. The variation in revolving speed difference (Ne−Nd) to be more distant from zero controls the clutch motor 30 to decrease its torque Tc according to the characteristic curve shown in FIG. 11. This means that a small value is set to the torque command value Tc*. With the decrease in torque Tc of the clutch motor 30, the output torque (torque of the drive shaft 22) is consequently reduced.

The overdrive control of the second embodiment exerts the similar effects to those of the conventional overdrive operation by the torque converter. A plurality of characteristic curves are prepared for the different values of the revolving speed Nd of the drive shaft 22 in FIG. 11. The characteristic curve with a large ordinate's intersection is set for the high revolving speed Nd of the drive shaft 22 (that is, Nd=Nd3). This increases the torque Tc of the clutch motor 30 to prevent gasoline engine 50 from revving up when the revolving speed difference (Ne−Nd) approaches to zero. The characteristic curve with a small ordinate's intersection is set for the low revolving speed Nd of the drive shaft 22 (that is, Nd=Nd1). This decreases the torque Tc of the clutch motor 30 to allow the gasoline engine 50 to rev up when the revolving speed difference (Ne–Nd) approaches to zero.

The power output apparatus 20 of the first embodiment can go into still another application given as a third embodiment of the present invention. In the first embodiment, the assist motor 40 is controlled to carry out the regenerative operation and regenerate electric power which makes up for the electric power consumed by the clutch motor 30. The regenerative operation of the assist motor 40 produces the negative torque Ta added to the positive torque Tc produced by the clutch motor 30 and thereby makes the torque Td output to the drive shaft 22 (=Tc–Ta) relatively small. This may cause insufficiency of the output torque Td in the case where the large torque is required, for example, when the vehicle comes to a slope or when the driver wants to pass another vehicle during the high-speed driving on the free way or the highway.

In the structure of the third embodiment, not only the clutch motor 30 but the assist motor 40 is controlled to carry out the power operation for the cases where a large output torque Td of the drive shaft 22 is required. In this structure, the electric power required for the power operation in both the clutch motor 30 and the assist motor 40 is supplied from the battery 94.

Figure 12:
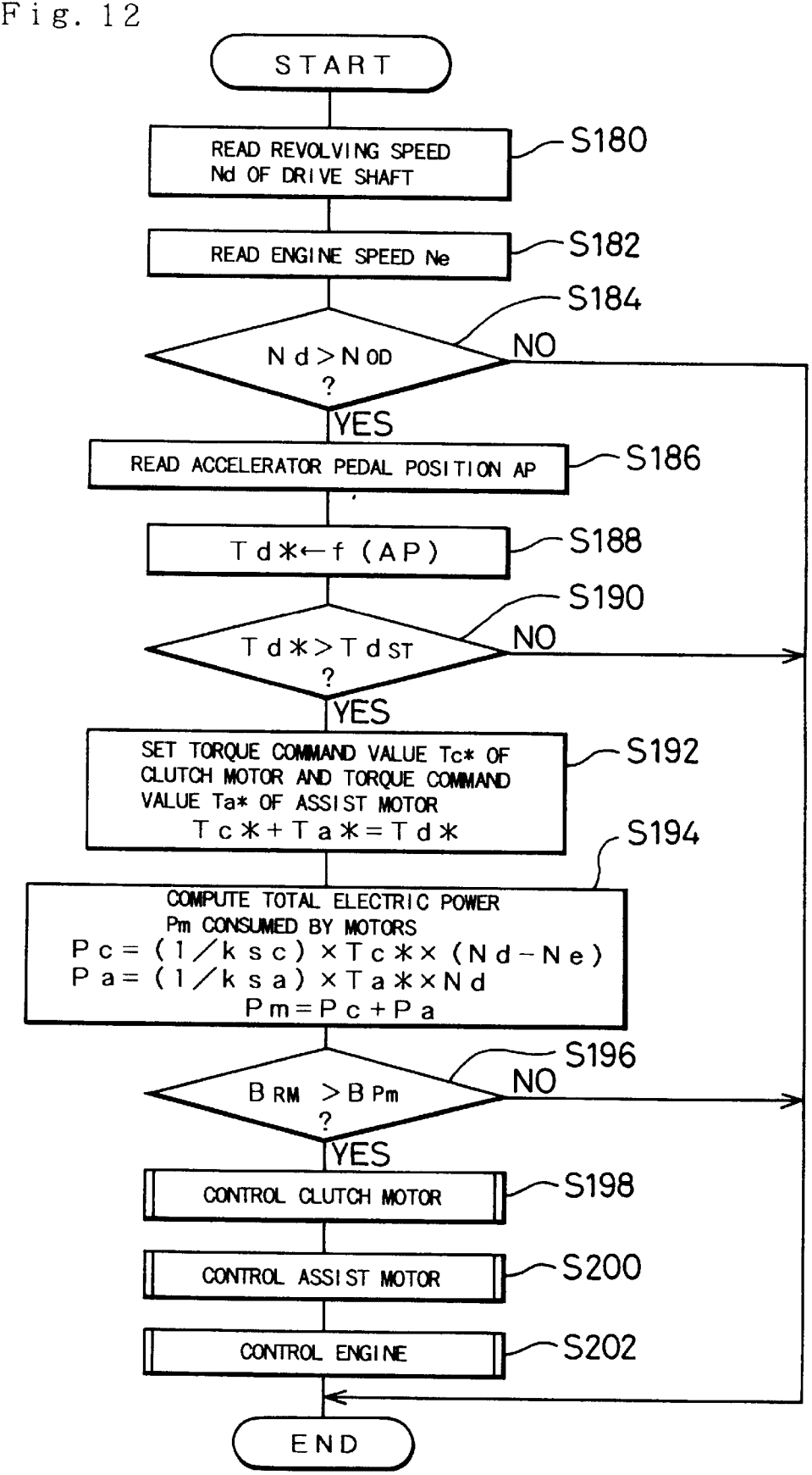
FIG. 12 is a flowchart showing a control process in the overdrive state executed by the control CPU 90 in a third embodiment of the present invention.

FIG. 12 is a flowchart showing a control process in the overdrive state executed by the control CPU 90 in the third embodiment. When the program enters the routine, the control CPU 90 of the controller 80 first receives data of revolving speed Nd of the drive shaft 22 at step S180 and data of revolving speed Ne of the gasoline engine 50 at step S182.

The revolving speed Nd of the drive shaft 22 read at step S180 is compared with a reference speed NOD for overdrive operation at step S184. When the input revolving speed Nd exceeds the reference speed NOD, the program proceeds to subsequent step S186. Otherwise, the program exits from the routine of FIG. 12.

The control CPU 90 reads the accelerator pedal position AP from the accelerator position sensor 65 at step S186 and computes the output torque (torque of the drive shaft 22) command value Td* corresponding to the input accelerator pedal position AP at step S188.

The output torque command value Td* thus computed is compared with a reference output torque TdST at step S190. An appropriate value has been set as the reference output torque TdST with a view to determining whether the driver requires a large output torque Td. At step S190 it is determined whether the output torque command value Td* representing the desired output torque required by the driver exceeds the preset reference output torque TdST. When the output torque command value Td* does not exceed the reference output torque TdST, the program determines that the driver does not require a large output torque and that no specific control is required to allow the power operation of the assist motor 40 as well as the clutch motor 30, and exits from the routine of FIG. 12.

When the output torque command value Td* exceeds the reference output torque TdST, on the other hand, the control CPU 90 determines the torque command value Tc* of the clutch motor 30 and the torque command value Ta* of the assist motor 40 based on the output torque command value Td* at step S192. The torque command values Tc* and Ta* are set to satisfy the following two conditions:

(1) The sum of the torque command value Tc* of the clutch motor 30 and the torque command value Ta* of the assist motor 40 is equal to the output torque command value Td* representing the desired output torque which the driver requires (Tc*+Ta*=Td*); and (2) The sum of an efficiency of power operation ksc of the clutch motor 30 and an efficiency of power operation ksa of the assist motor 40 gives a maximum efficiency.

Figure 13:
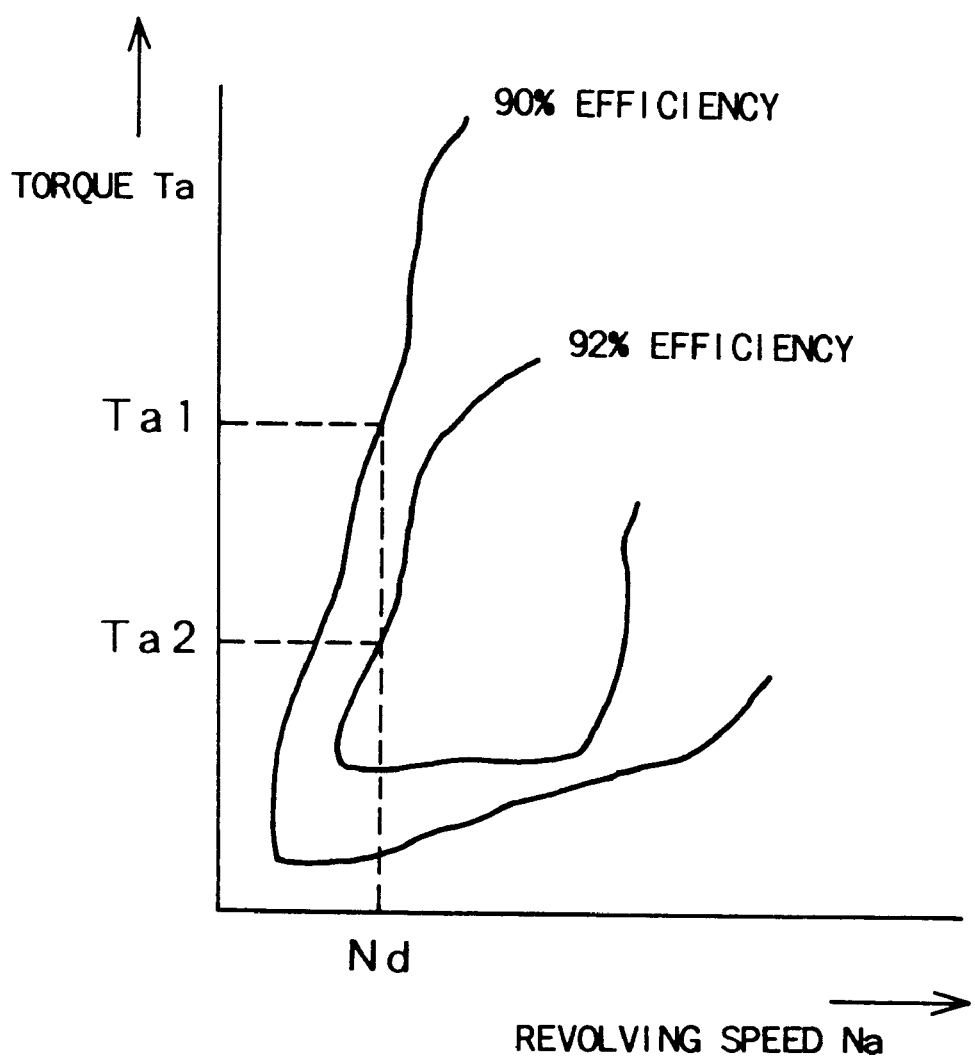
FIG. 13 is a characteristic diagram illustrating an efficiency map of the motor.

The best working point of each motor to attain the maximum efficiency of power operation can be read from an efficiency map as illustrated in the characteristic diagram of FIG. 13. For example, working points having 90% and 92% efficiencies of power operation of the motor exist on a 90% efficiency curve and a 92% efficiency curve in FIG. 13, respectively. Since each motor follows its own efficiency map, different efficiency maps should be used for the clutch motor 30 and the assist motor 40. The revolving speed Nc of the clutch motor 30 is given as the difference (Nd–Ne) between the revolving speed Nd of the drive shaft 22 read at step S180 and the revolving speed Ne of the gasoline engine 50 (revolving speed of the crankshaft 56) read at step S182. The revolving speed Na of the assist motor 40 is identical with the revolving speed Nd of the drive shaft 22. When the efficiency map of FIG. 13 is applied to the assist motor 40, for example, the assist motor 40 rotated at the revolving speed Na=Nd gives a 90% efficiency of power operation ksa at the torque Ta=Ta1 and a 92% efficiency at the torque Ta=Ta2. The torque Tc attaining the maximum efficiency at the revolving speed (Nd–Nc) is read from the efficiency map of the clutch motor 30 and set to the torque command value Tc* of the clutch motor 30. The torque Ta attaining the maximum efficiency at the revolving speed Nd is read from the efficiency map of the assist motor 40 and set to the torque command value Ta* of the assist motor 40. The torque command values Tc* and Ta* set in this manner can satisfy the above condition (2).

When the clutch motor 30 and the assist motor 40 consume almost equivalent amounts of electric power, the satisfied condition (2) ensures the substantially minimum sum of electric power consumed by the clutch motor 30 and the assist motor 40. When the clutch motor 30 and the assist motor 40 consume significantly different amounts of electric power, on the contrary, the satisfied condition (2) may not assure the minimum sum of electric power consumed by the clutch motor 30 and the assist motor 40. This may occur, for example, in the case where the electric power consumed by the clutch motor 30 is significantly greater than the electric power consumed by the assist motor 40. Under such conditions, the sum of electric power consumed by the clutch motor 30 and the assist motor 40 may be minimized not at the working point attaining the high efficiencies of both the clutch motor 30 and the assist motor 40 but at the working point attaining the higher efficiency of the clutch motor 30 but the relatively lower efficiency of the assist motor 40. The consumed power of the clutch motor 30 is, however, substantially equivalent to that of the assist motor 40 in general. Therefore, when the above condition (2) is satisfied, the sum of electric power consumed by the clutch motor 30 and the assist motor 40 is minimized.

At step S194, the control CPU 90 calculates total electric power Pm consumed by the clutch motor 30 and the assist motor 40 from the torque command values Tc* and Ta* set at step S192. Electric power Pc consumed by the clutch motor 30 is given by:

$$Pc=(1/ksc) \times Tc^* \times (Nd-Nc)$$

while electric power Pa consumed by the assist motor 40 is expressed as:

$$Pa=(1/ksa) \times Ta^* \times Nd$$

The total electric power Pm consumed by the two motors 30 and 40 is thus given as:

$$Pm=Pc+Pa$$

The program then proceeds to step S196 at which the residual capacity BRM of the battery 94 measured by the residual capacity meter 99 is compared with a reference value BPm, which is varied depending upon the total consumed power Pm. As described previously, the electric power stored in the battery 94 should cover the total electric power Pm consumed by the clutch motor 30 and the assist motor 40. The battery 94 is thus required to have a sufficient residual capacity to cover the total consumed power Pm. At step S196 it is determined whether the residual capacity BRM of the battery 94 is greater than the reference value BPm set corresponding to the total consumed power Pm. This shows whether the residual capacity BRM of the battery 94 is sufficient to supply the total consumed power Pm. When the residual capacity BRM of the battery 94 is not greater than the reference value BPm and insufficient to cover the total consumed power Pm, the program exits from the routine of FIG. 12.

When the residual capacity BRM of the battery 94 is greater than the reference value BPm, on the other hand, the program proceeds to step S198 to control the clutch motor 30, to step S200 to control the assist motor 40, and to step S202 to control the gasoline engine 50. The control procedures of the clutch motor 30 and the assist motor 40 are similar to those of FIGS. 7 and 8 in the first embodiment. Unlike the first embodiment, however, the assist motor 40 is controlled to carry out not the regenerative operation but the power operation in the third embodiment. Note that the torque produced by the assist motor 40 in the third embodiment acts in the reverse of the torque produced in the first embodiment, that is, in the direction of rotation of the drive shaft 22, and that the torque command value Ta* thereby has the reverse sign. The gasoline engine 50 is controlled to be driven at the possible highest efficiency. As a matter of convenience of illustration, the control operations of the clutch motor 30, the assist motor 40, and the gasoline engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to control the gasoline engine 50 concurrently.

Figure 14:
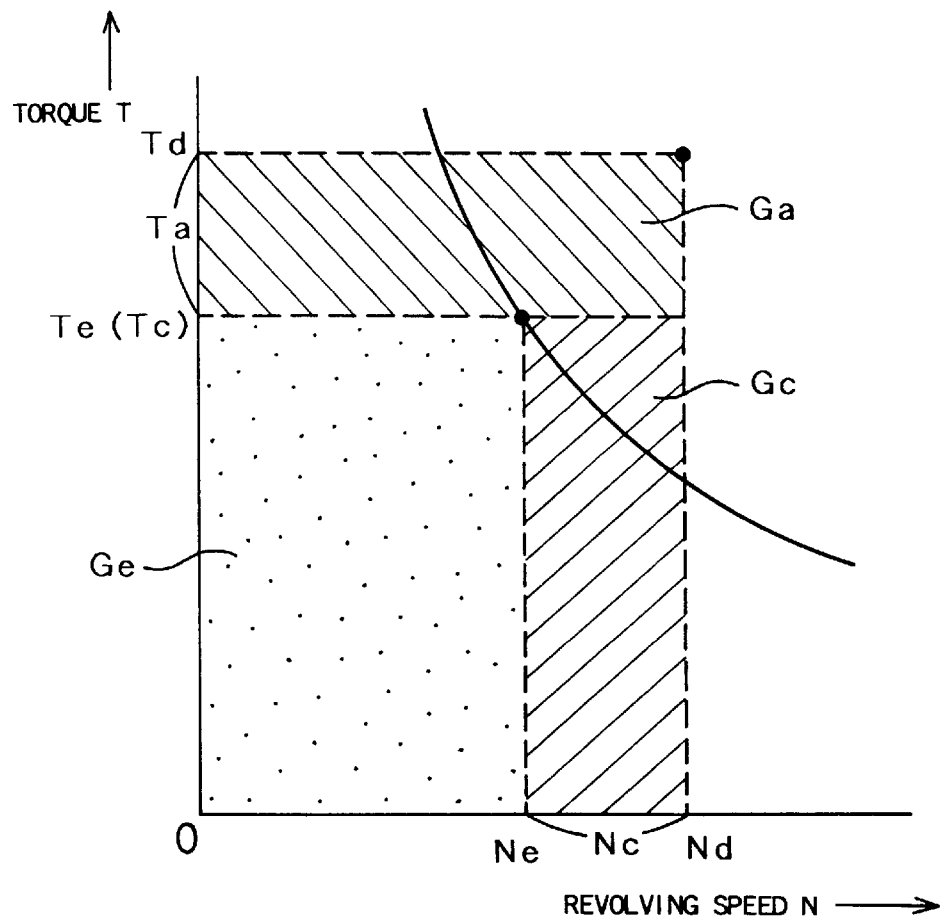
FIG. 14 is a graph schematically illustrating an amount of energy consumed by the clutch motor 30 and that consumed by the assist motor 40 according to the control process of FIG. 12.

FIG. 14 is a graph schematically illustrating an amount of energy consumed by the clutch motor 30 and that consumed by the assist motor 40 according to the control process of FIG. 12. The gasoline engine 50 driven at an engine speed Ne and an engine torque Te outputs energy in a region Ge. The clutch motor 30 consumes energy in a region Gc supplied as electric power from the battery 94 and carries out the power operation to enable the drive shaft 22 to rotate at the revolving speed Nd higher than the revolving speed Ne of the crankshaft 56 of the gasoline engine 50. The assist motor 40 consumes energy in a region Ga supplied as electric power from the battery 94 and carries out the power operation to increase the output torque Td of the drive shaft 22 by the torque Ta produced by the assist motor 40.

Figure 15:
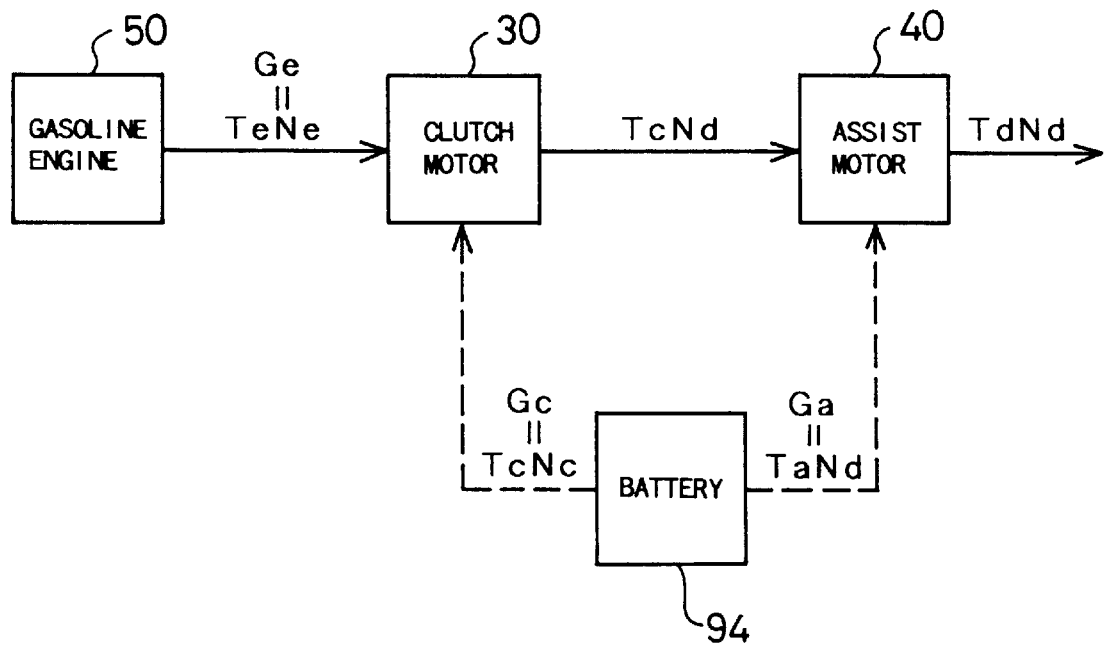
FIG. 15 shows a flow of energy between the gasoline engine 50, the clutch motor 30, the assist motor 40, and the battery 94.

FIG. 15 shows a flow of energy between the gasoline engine 50, the clutch motor 30, the assist motor 40, and the battery 94. Mechanical energy (Te×Ne) in the region Ge produced by the gasoline engine 50 is transmitted to the clutch motor 30. The clutch motor 30 converts electrical energy in the region Gc (Tc×Nc) supplied from the battery 94 to mechanical energy and adds the converted mechanical energy to the mechanical energy in the region Ge (Te×Ne) transmitted from the gasoline engine 50. The sum of mechanical energy (Tc×Nd) is accordingly transmitted from the clutch motor 30 to the assist motor 40. The assist motor 40 converts electrical energy in the region Ga (Ta×Nd) to mechanical energy and adds the converted mechanical energy to the mechanical energy (Tc×Nd) transmitted from the clutch motor 30. The total mechanical energy (Td×Nd) is eventually output to the drive shaft 22.

The process of the third embodiment enables both the clutch motor 30 and the assist motor 40 to carry out the power operation. The drive shaft 22 accordingly receives the sum of the torque Tc produced by the clutch motor 30 and the torque Ta produced by the assist motor 40, both of which act in the direction of rotation of the drive shaft 22. This gives a large output torque Td of the drive shaft 22 equal to (Tc+Ta). The structure of the third embodiment is preferred in the case where the large output torque Td is required, for example, when the vehicle comes to a slope or when the driver wants to pass another vehicle during the high-speed driving on the free way or the highway.

The clutch motor 30 and the assist motor 40 are controlled to maximize the sum of the efficiency of power operation ksc of the clutch motor 30 and the efficiency of power operation ksa of the assist motor 40. This effectively reduces the energy loss in the clutch motor 30 and the assist motor 40 and realizes the substantially minimum sum of electric power consumed by the clutch motor 30 and the assist motor 40, thereby improving the fuel consumption of the gasoline engine 50.

There may be many other modifications, alternations, and changes without departing from the scope or spirit of essential characteristics of the invention. It is thus clearly understood that the above embodiments are only illustrative and not restrictive in any sense. Some examples of modification are given below.

In the structure of the power output apparatus 20 shown in FIG. 1, the clutch motor 30 and the assist motor 40 are separately attached to the different positions of the drive shaft 22. Like a modified power output apparatus 20A illustrated in FIG. 16, however, the clutch motor and the assist motor may be joined integrally with each other. A clutch motor 30A of the power output apparatus 20A includes an inner rotor 34 connecting with the crankshaft 56 and an outer rotor 32A linked with the drive shaft 22. Three-phase coils 36 are attached to the inner rotor 34, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36 are mounted on the inner rotor 34 connecting with the crankshaft 56, a rotary transformer 38 for supplying power to the three-phase coils 36 of the clutch motor 30A is attached to the crankshaft 56.

In the power output apparatus 20A, the voltage applied to the three-phase coils 36 on the inner rotor 34 is controlled against the inner-surface magnetic pole of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power output apparatus 20. The control procedures discussed as the first through the third embodiments above are applicable to the power output apparatus 20A shown in FIG. 16, which accordingly exerts the same effects as those of the power output apparatus 20 shown in FIG. 1.

Figure 16:
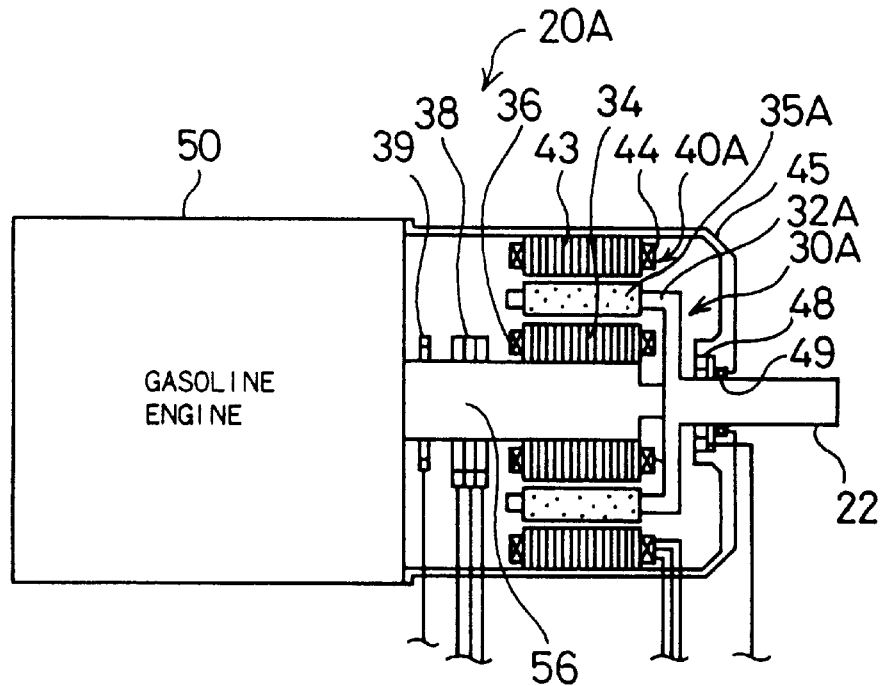
FIG. 16 is a schematic view illustrating an essential part of another power output apparatus 20A as a modification of the invention.

In the power output apparatus 20A of FIG. 16, the clutch motor 30A and the assist motor 40A are integrally joined with each other, which shortens the length of the power output apparatus 20A along the drive shaft 22. The outer rotor 32A functions concurrently as one of the rotors in the clutch motor 30A and as the rotor of the assist motor 40A, thereby effectively reducing the size and weight of the whole power output apparatus 20A.

The modified structure that the outer rotor 32A works as one of the rotors in the clutch motor 30A and as the rotor of the assist motor 40A causes the clutch motor 30A and the assist motor 40A to magnetically interfere with each other and thereby have adverse effects on each other. In order to prevent the large magnetic interference, the outer rotor 32A may be constructed as a double-cylinder structure including two concentric cylinders. One of the cylinders is assigned to the rotor of the clutch motor 30A, and the other to the rotor of the assist motor 40A. The two cylinders apart from each other by a predetermined distance are connected to the drive shaft 22. A magnetic shielding member for blocking the magnetic lines of force is also effective for preventing the magnetic interference.

Figure 17:
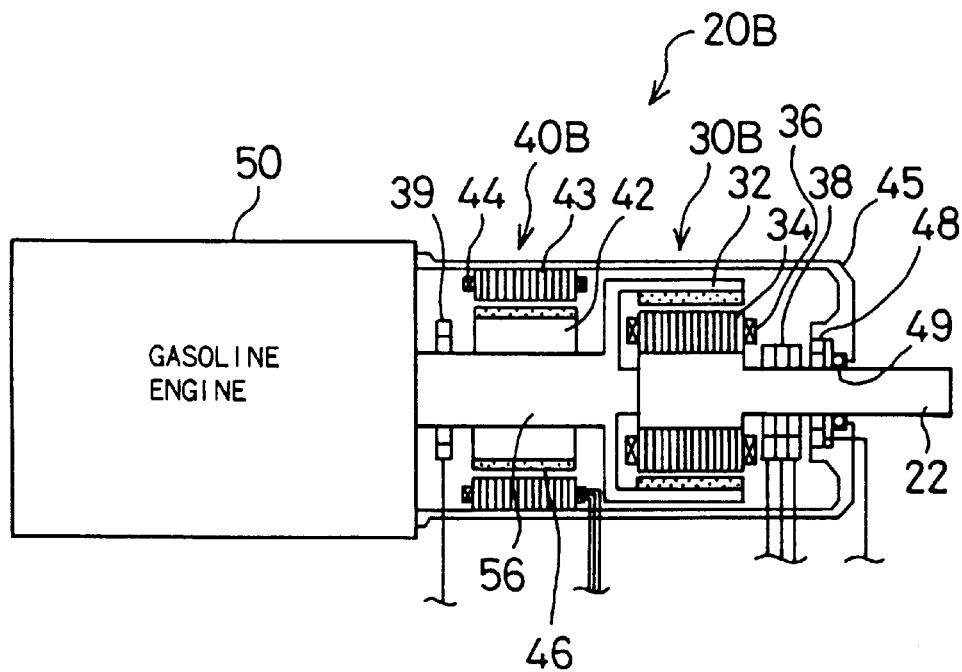
FIG. 17 is a schematic view illustrating an essential part of still another power output apparatus 20B as another modification of the invention.

Although the assist motor 40 is attached to the drive shaft 22 in the power output apparatus 20 of FIG. 1, an assist motor 40B may be attached to the crankshaft 56 of the gasoline engine 50 like another power output apparatus 20B shown in FIG. 17.

The power output apparatus 20B of FIG. 17 has a similar structure to that of the power output apparatus 20 of FIG. 1, except that the assist motor 40B is attached to the crankshaft 56 placed between the gasoline engine 50 and a clutch motor 30B. In the power output apparatus 20B of FIG. 17, like elements as those of the power output apparatus 20 of FIG. 1 are shown by like numerals or symbols and are not explained here. The symbols used in the above description have like meanings unless otherwise specified.

The following describes operation of the power output apparatus 20B shown in FIG. 17. By way of example, it is assumed that the gasoline engine 50 is driven with a torque Te and at a revolving speed Ne. When a torque Ta is added to the crankshaft 56 by the assist motor 40B linked with the crankshaft 56, the sum of the torques (Te+Ta) consequently acts on the crankshaft 56. When the clutch motor 30B is controlled to produce the torque Tc equal to the sum of the torques (Te+Ta), the torque Tc (=Te+Ta) is eventually transmitted from the clutch motor 30B to the drive shaft 22.

When the vehicle is driven in a normal driving state, that is, when the revolving speed Nd of the drive shaft 22 is lower than the revolving speed Ne of the gasoline engine 50 (Nd<Ne), the clutch motor 30B regenerates electric power based on the revolving speed difference Nc between the revolving speed Ne of the gasoline engine 50 and the revolving speed Nd of the drive shaft 22. The regenerated power is supplied to the assist motor 40B via the first and the second driving circuits 91 and 92 to activate the assist motor 40B. Provided that the torque Ta of the assist motor 40B is set to a value, which enables the assist motor 40B to consume the electrical energy substantially equivalent to the electrical energy regenerated by the clutch motor 30B, free torque conversion is allowed for the energy output from the gasoline engine 50 within a range holding the relationship of Equation (6) given below. Since the relationship of Equation (6) represents the ideal state with an efficiency of 100%, (Tc×Nd) is a little smaller than (Te×Ne) in the actual state:

$$Te \times Ne = Tc \times Nd \qquad (6)$$

Figure 18:
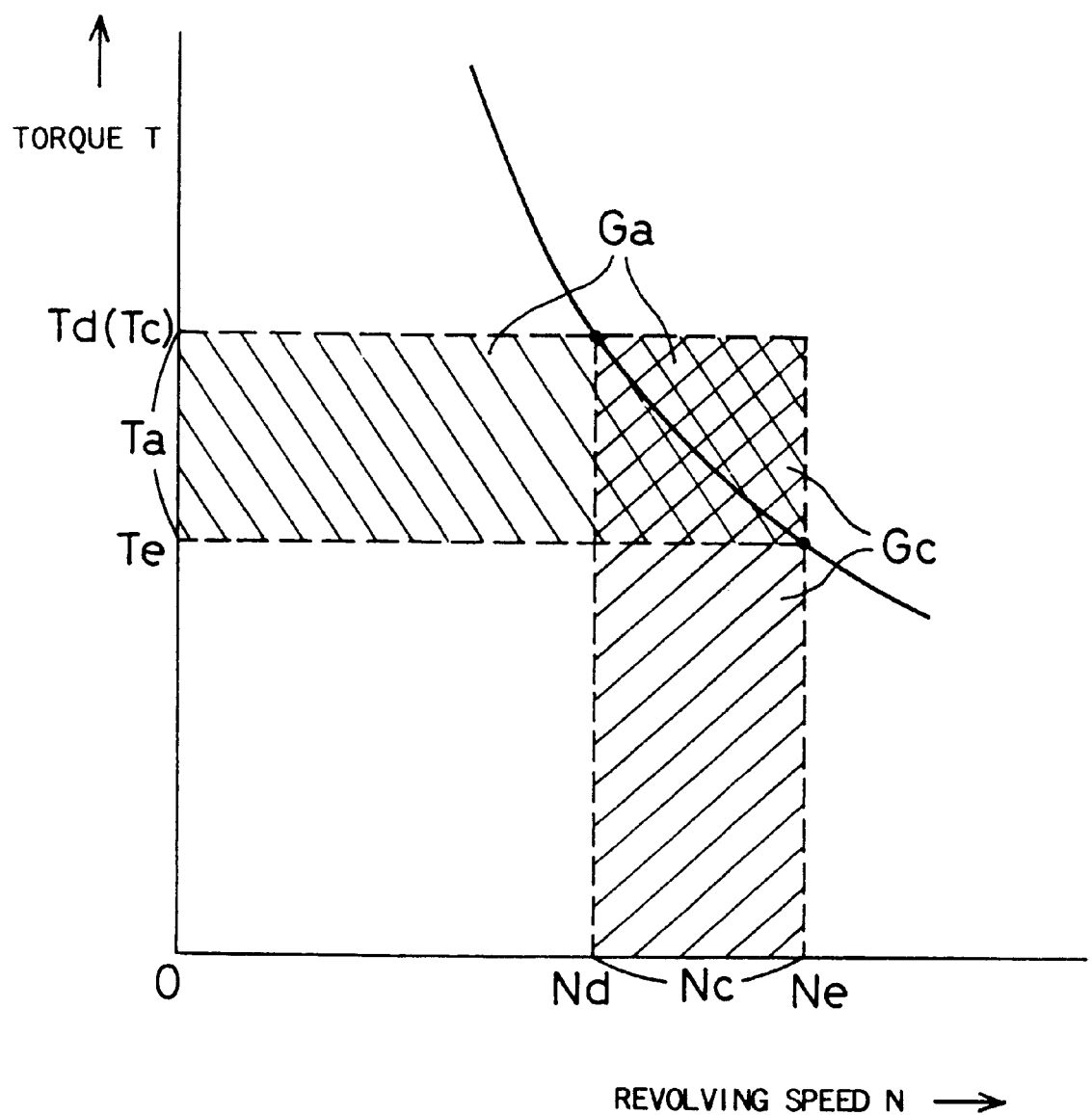
FIG. 18 is a graph schematically illustrating an amount of energy regenerated by the clutch motor 30B and that consumed by the assist motor 40B in the modified structure of FIG. 17.

FIG. 18 is a graph schematically showing an amount of energy regenerated by the clutch motor 30B and that consumed by the assist motor 40B. In the example of FIG. 18, the crankshaft 56 of the gasoline engine 50 is driven at a revolving speed Ne and a torque Te, whereas the drive shaft 22 is rotated at a revolving speed Nd and a torque Td. The clutch motor 30B regenerates energy in a region Gc as electric power. The regenerated power is supplied to the assist motor 40B as energy in a region Ga, which is consumed by the assist motor 40B.

When the vehicle is driven at high speed on the highway or free way, that is, when the revolving speed Nd of the drive shaft 22 is higher than the revolving speed Ne of the gasoline engine 50 (Nd>Ne), the clutch motor 30B works as a normal motor. The clutch motor 30B accordingly enhances the speed of rotation of the inner rotor 34 relative to the outer rotor 32. Provided that the torque Ta of the assist motor 40B is set to a negative value to enable the assist motor 40B to regenerate power substantially equivalent to the electrical energy consumed by the clutch motor 30B, free torque conversion is also allowed for the energy output from the gasoline engine 50 within a range holding the relationship of Equation (6) given above.

With only a little modification, the control procedures discussed as the first through the third embodiments above are also applicable to the power output apparatus 20B shown in FIG. 17, which accordingly exerts the same effects as those of the power output apparatus 20 shown in FIG. 1. The required modification of the control procedures is described briefly.

When the control procedure of the first embodiment is executed by the power output apparatus 20 of FIG. 1, the torque command value Tc* of the clutch motor 30 is set equal to the target engine torque Te* at step S92 in the flowchart of FIG. 6. In the power output apparatus 20B of FIG. 17, however, the torque command value Tc* of the clutch motor 30B should be set equal to the output torque command value Td*.

The torque command value Ta* of the assist motor 40 is computed at step S98 of FIG. 6 in the first embodiment or at step S172 of FIG. 10 in the second embodiment according to the equation expressed as:

$$Ta^* = Pa/(Ksa \times Nd)$$

In the power output apparatus 20B of FIG. 17, the calculation should be changed to:

$$Ta^* = Pa/(Ksa \times Ne)$$

Figure 19:
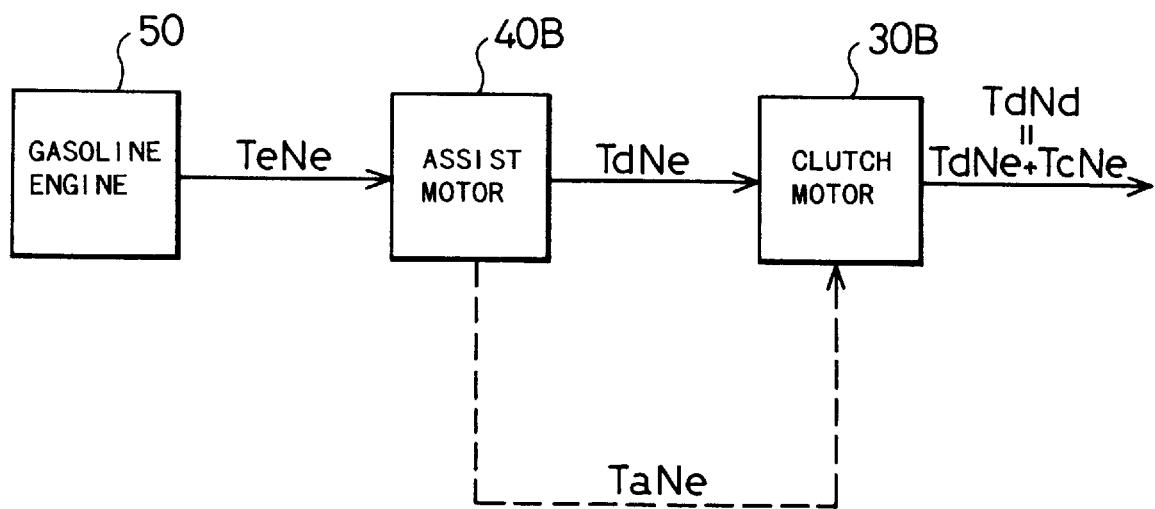
FIG. 19 shows a flow of energy between the gasoline engine 50, the clutch motor 30 and assist motor 40.

In the structure of the first embodiment, while the power output apparatus 20 of FIG. 1 has the energy flow shown in FIG. 9, the power output apparatus 20B of FIG. 17 gives a different energy flow. Namely, in the power output apparatus 20B, the energy flow show in FIG. 9 is changed to the one show in FIG. 19. In the power output apparatus 20B, as shown in FIG. 19 the mechanical energy (Te×Ne) produced by the gasoline engine 50 is first transmitted to the assist motor 40B. The assist motor 40B converts part of the transmitted mechanical energy to electrical energy (Ta×Ne) and supplies the converted electrical energy (Ta×Ne) to the clutch motor 30B while directly transmitting the remainder of mechanical energy (Td×Ne) to the clutch motor 30B. The clutch motor 30B converts the electrical energy (Ta×Ne) supplied from the assist motor 40B to mechanical energy (Tc×Nc) and adds the converted mechanical energy (Tc×Nc) to the remainder of mechanical energy (Td×Ne) transmitted from the assist motor 40B. The total mechanical energy (Td×Nd) is eventually output to the drive shaft 22.

When the control procedure of the third embodiment is executed by the power output apparatus 20 of FIG. 1, the torque command value Tc* of the clutch motor 30 and the torque command value Ta* of the assist motor 40 are set to satisfy the two specific conditions discussed above at step S192 in the flowchart of FIG. 12. In the power output apparatus 20B of FIG. 17, however, the torque command value Tc* of the clutch motor 30 should be set equal to the output torque command value Td*. The torque command value Ta* of the assist motor 40 should be set to satisfy the following equation and realize the maximum efficiency of power operation ksa:

$$Ta*+Te*=Td*$$

wherein Te* represents a target engine torque or torque command value of the gasoline engine 50. The target engine torque Te* of the gasoline engine 50 should also be set to satisfy the above equation and realize the possible highest efficiency. The target engine torque Te* of the gasoline engine 50 is used in the process of controlling the gasoline engine 50 at step S202 in the flowchart of FIG. 12.

The electric power Pa consumed by the assist motor 40 is computed at step S194 of FIG. 12 in the third embodiment according to the equation expressed as:

$$Pa=(1/ksa) \times Ta* \times Nd$$

In the power output apparatus 20B of FIG. 17, the calculation should be changed to:

$$Pa=(1/ksa) \times Ta* \times Ne$$

In the structure of the third embodiment, while the power output apparatus 20 of FIG. 1 has the energy flow shown in FIG. 15, the power output apparatus 20B of FIG. 17 gives a different energy flow. The clutch motor 30B and the assist motor 40B change places in the drawing of FIG. 15. In the power output apparatus 20B, the mechanical energy in the region Ge (Te×Ne) produced by the gasoline engine 50 is first transmitted to the assist motor 40B. The assist motor 40B converts the electrical energy (Ta×Nd) supplied from the battery 94 to mechanical energy and adds the converted mechanical energy to the mechanical energy in the region Ge (Te×Ne) transmitted from the gasoline engine 50. The sum of mechanical energy (Td×Ne) is accordingly transmitted from the assist motor 40B to the clutch motor 30B. The clutch motor 30B converts the electrical energy (Tc×Nc) supplied from the battery 94 to mechanical energy and adds the converted mechanical energy to the mechanical energy (Td×Ne) transmitted from the assist motor 40B. The total mechanical energy (Td×Nd) is eventually output to the drive shaft 22.

The modifications discussed above allow the power output apparatus 20B of FIG. 17 to execute the first through the third embodiments and exert the same effects.

Figure 20:
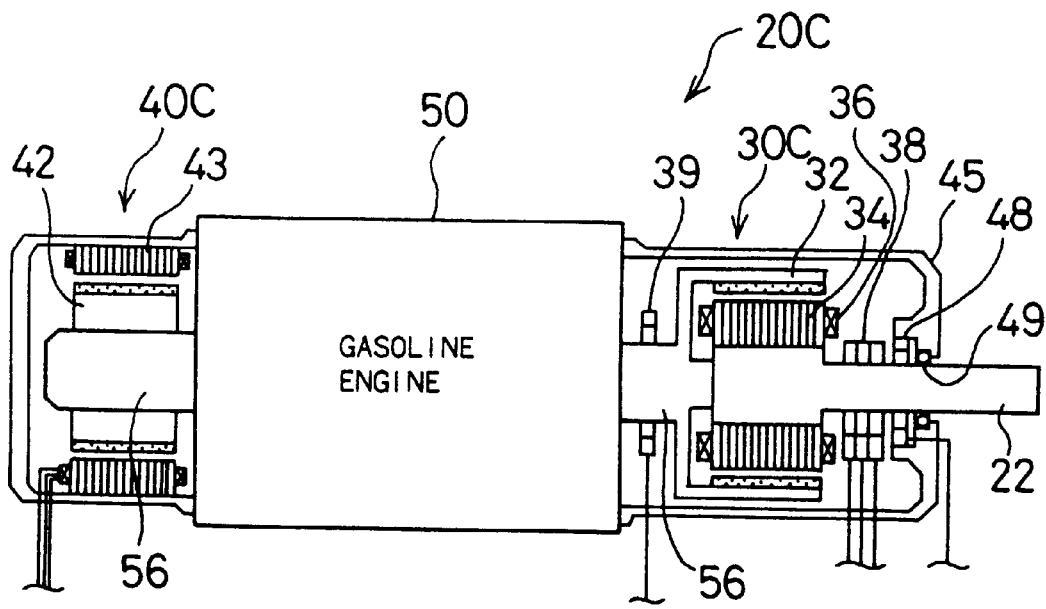
FIG. 20 is a schematic view illustrating an essential part of another power output apparatus 20C as still another modification of the invention.

In the power output apparatus 20B of FIG. 17, the assist motor 40B is attached to the crankshaft 56 placed between the gasoline engine 50 and the clutch motor 30B. Like another power output apparatus 20C illustrated in FIG. 20, however, the gasoline engine 50 may be interposed between a clutch motor 30C and an assist motor 40C attached to the crankshaft 56. The control procedures executed by the power output apparatus 20B of FIG. 17 are also applicable to the power output apparatus 20C, which accordingly realizes the same operations and effects.

In the power output apparatus 20B of FIG. 17, the clutch motor 30B and the assist motor 40B are separately attached to the different positions of the crankshaft 56. Like a power output apparatus 20D shown in FIG. 21, however, a clutch motor 30D and an assist motor 40D may be joined integrally with each other. The clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. The assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30B of the power output apparatus 20B shown in FIG. 17. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40B of the power output apparatus 20B. The control procedures of the first through the third embodiments discussed above are also applicable to the power output apparatus 20D shown in FIG. 21, which accordingly exerts the same effects as those of the power output apparatus 20B shown in FIG. 17.

Figure 21:
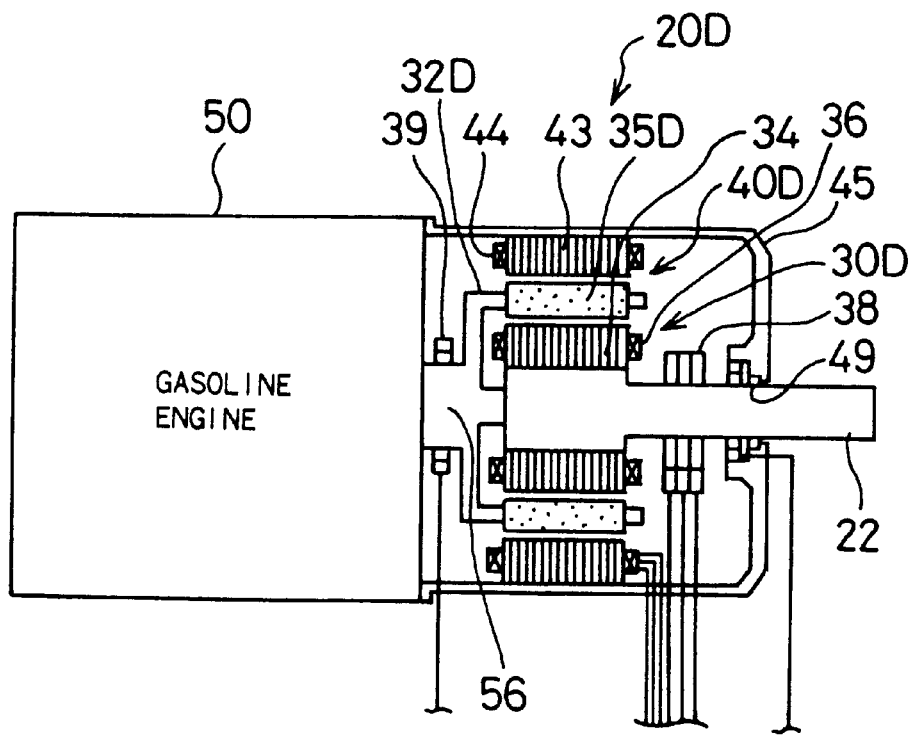
FIG. 21 is a schematic view illustrating an essential part of still another power output apparatus 20D as another modification of the invention.

Like the power output apparatus 20A of FIG. 16, in the power output apparatus 20D of FIG. 21, the clutch motor 30D and the assist motor 40D are integrally joined with each other, which shortens the length of the power output apparatus 20D along the drive shaft 22. The outer rotor 32D functions concurrently as one of the rotors in the clutch motor 30D and as the rotor of the assist motor 40D, thereby effectively reducing the size and weight of the whole power output apparatus 20D.

In all the structures of FIGS. 1, 16, 17, 20, and 21, the power output apparatus includes the assist motor 40 as well as the clutch motor 30. The overdrive control may, however, be realized by the structure of FIG. 1 without the assist motor 40. In this modified structure without the assist motor 40, the clutch motor 30 is controlled to carry out the power operation using the electric power stored in the battery 94. This enables the drive shaft 22 to rotate at the revolving speed higher than that of the crankshaft 56 of the gasoline engine 50 and to output the torque identical with the engine torque of the gasoline engine 50. In accordance with a concrete procedure, the control CPU 90 controls the first riving circuit 91 to supply the electric power stored in the battery 94 to the clutch motor 30 via the first driving circuit 91 and make the clutch motor 30 carry out the power operation, so that the drive shaft 22 is rotated at a revolving speed higher than that of the crankshaft 56.

Figure 22:
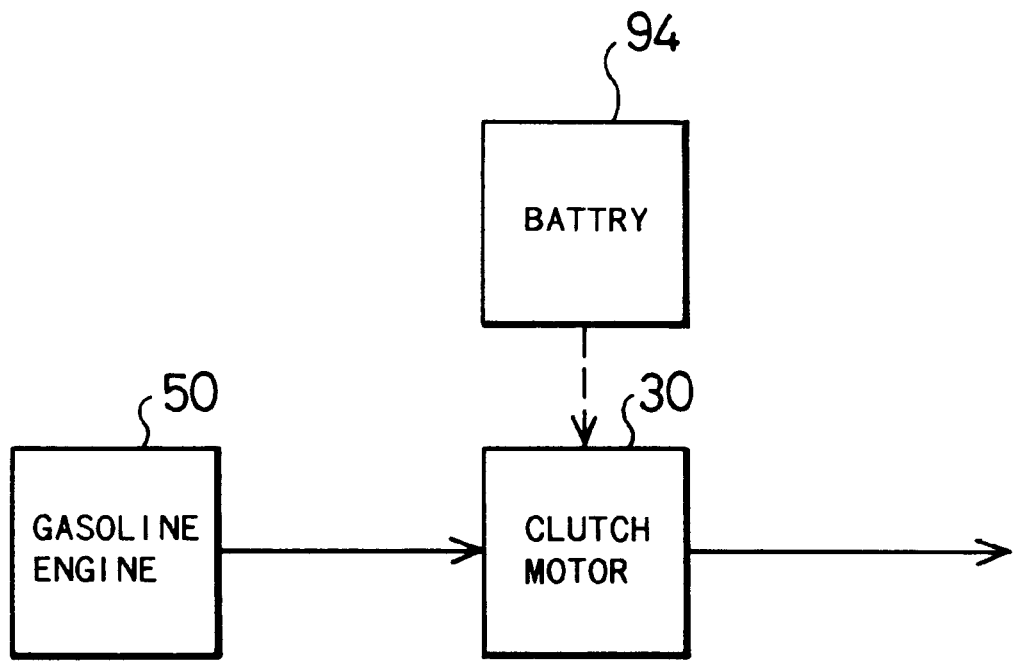
FIG. 22 shows a flow of energy between the gasoline engine 50, the clutch motor 30, and the battery 94.

FIG. 22 shows a flow of energy between the gasoline engine 50, the clutch motor 30, and the battery 94. Mechanical energy produced by the gasoline engine 50 is transmitted to the clutch motor 30. The clutch motor 30 converts electrical energy supplied from the battery 94 to mechanical energy and adds the converted mechanical energy to the mechanical energy transmitted from the gasoline engine 50. The sum of mechanical energy is accordingly output from the clutch motor 30 to the drive shaft 22.

Figure 23:
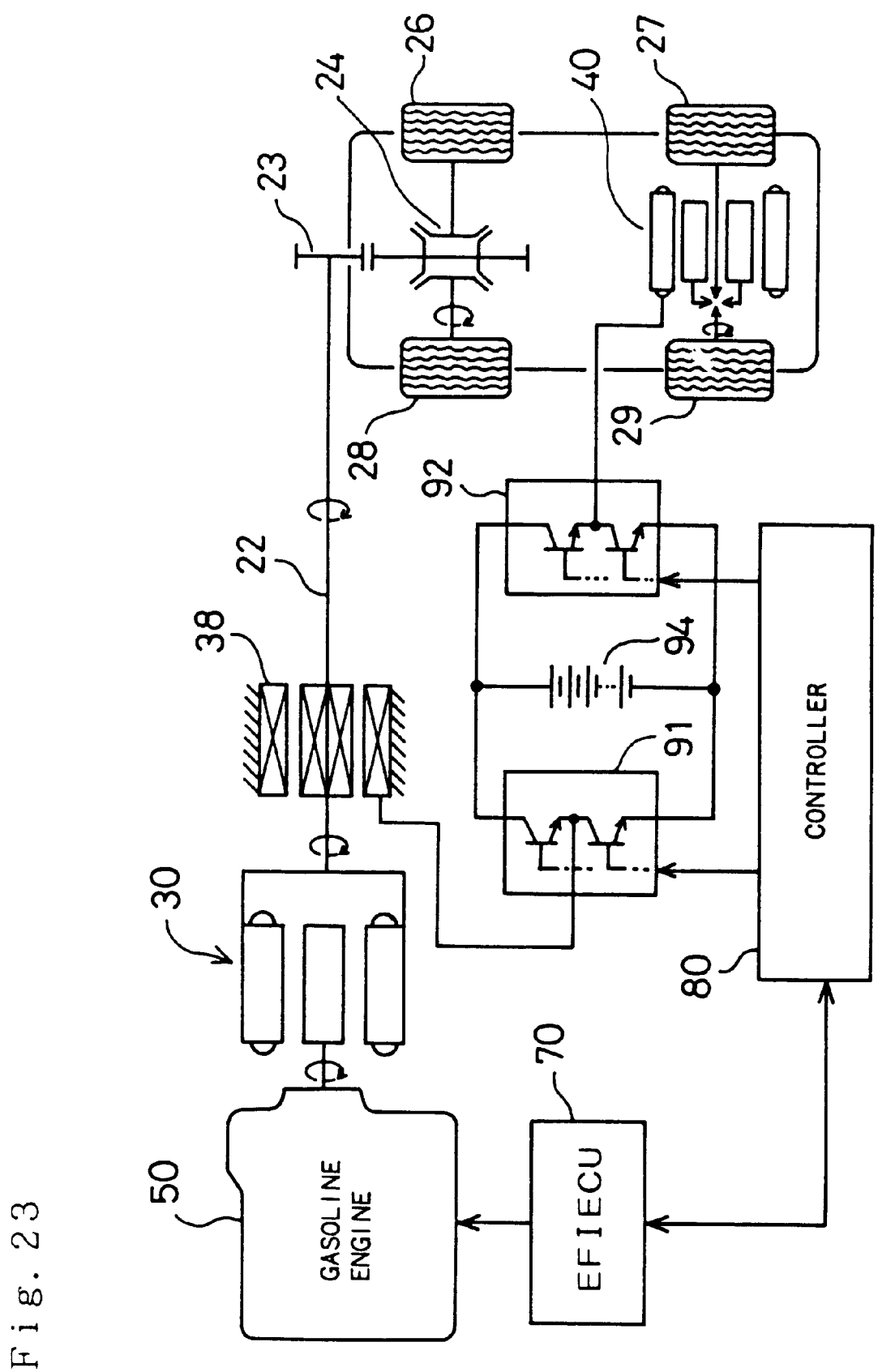
FIG. 23 shows application of the power output apparatus 20 of FIG. 1 to a vehicle with a four-wheel drive.

The power output apparatus 20 of FIG. 1 is also applicable to the vehicle with a four-wheel drive (4WD) as shown in FIG. 23. In the structure of FIG. 23, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28.

The control procedures of the first through the third embodiments discussed above can also be realized by this modified structure. In the first and the second embodiments, the clutch motor 30 is controlled to implement the power peration and enables the drive shaft 22 to rotate at a revolving speed higher than that of the gasoline engine 50. Rotation of the drive shaft 22 at the higher revolving speed is transmitted via the differential gear 24 to rotate the front driving wheels 26 and 28 at high speed. Rotation of the rear driving wheels 27 and 29 causes the regenerative operation of the assist motor 40. The electric power regenerated by the assist motor 40 makes up for the electric power consumed by the clutch motor 30.

In the third embodiment, the clutch motor 30 is controlled to implement the power operation and apply the torque to the front driving wheels 26 and 28, whereas the assist motor 40 is also controlled to implement the power operation and apply the torque to the rear driving wheels 27 and 29.

The gasoline engine 50 driven by means of gasoline is used as the engine in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, and superconducting motors may be used for both the regenerative operation and power operation, while stepping motors are applicable only for the power operation.

In the above embodiments discussed above, the outer rotor 32 of the clutch motor 30 is linked with the crankshaft 56, whereas the inner rotor 34 is connected to the drive shaft 22. Alternatively, the outer rotor 32 may be linked with the drive shaft 22 and the inner rotor 34 with the crankshaft 56. Disk rotors facing each other may be used instead of the outer rotor 32 and the inner rotor 34.

The rotary transformer 38 used as means for transmitting electric power to the clutch motor 30 may be replaced by a slip ring-brush contact, a slip ring-mercury contact, a semiconductor coupling of magnetic energy, or the like.

In the above power output apparatuses, transistor inverters are used for the first and the second driving circuits 91 and 92. Other examples applicable to the driving circuits 91 and 92 include IGBT (insulated gate bipolar mode transistor) inverters, thyristor inverters, voltage Pwm (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94. The battery 94 also functions as means for absorbing the regenerated power. A variety of electrical equipment (for example, lighting facilities, sound facilities, and cooling facilities) mounted on the vehicle other than the battery 94 may be applied to the means for absorbing the regenerated power.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus comprising:

an output shaft for receiving power from an engine;

a drive shaft for transmitting power to a load;

a first motor comprising a first rotor connected with said output shaft of said engine and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to control said second motor-driving circuit to enable said second motor to regenerate electric power, and to control said first motor-driving circuit to supply the regenerated electric power to said first motor to drive said first motor, and to adjust revolving speeds of said drive shaft and said output shaft so that said revolving speed of said drive shaft is higher than said revolving speed of said output shaft.

2. The power output apparatus in accordance with claim 1, wherein said third rotor is mounted on said second rotor connected with said drive shaft.

3. A power output apparatus comprising:

an output shaft for receiving power from an engine;

a drive shaft for transmitting power to a load;

a first motor comprising a first rotor connected with said output shaft of said engine and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to control said second motor-driving circuit to enable said second motor to regenerate electric power, and to control said first motor-driving circuit to supply the regenerated electric power and the electric power stored in said storage device to said first motor to drive said first motor, and to adjust revolving speeds of said drive shaft and said output shaft so that said revolving speed of said drive shaft is higher than said revolving speed of said output shaft.

4. A power output apparatus comprising:

an output shaft for receiving power from an engine;

a drive shaft for transmitting power to a load;

a first motor comprising a first rotor connected with said output shaft of said engine and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to control said second motor-driving circuit to enable said second motor to regenerate electric power, and to control said first motor-driving circuit to supply the regenerated electric power to said first motor to drive said first motor and at least partly to said storage device to be stored, and to adjust revolving speeds of said drive shaft and said output shaft so that said revolving speed of said drive shaft is higher than said revolving speed of said output shaft.

5. A power output apparatus comprising:

an output shaft for receiving power from an engine;

a drive shaft for transmitting power to a load;

a first motor comprising a first rotor connected with said output shaft of said engine and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to control said first motor-driving circuit to supply the electric power from said storage device to said first motor to drive said first motor, and to adjust revolving speeds of said drive shaft and said output shaft so that said revolving speed of said drive shaft is higher than said revolving speed of said output shaft.

6. A power output apparatus comprising:

an output shaft for receiving power from an engine;

a drive shaft for transmitting power to a load;

a first motor comprising a first rotor connected with said output shaft of said engine and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to control said second motor-driving circuit to supply the electric power from said storage device to said second motor to drive said second motor, and to control said first motor-driving circuit to supply the electric power from said storage device to said first motor to drive said first motor, and to adjust revolving speeds of said drive shaft and said output shaft so that said revolving speed of said drive shaft is higher than said revolving speed of said output shaft.

7. The power output apparatus in accordance with claim 6, wherein said third rotor is mounted on said second rotor connected with said drive shaft.

8. A power output apparatus comprising:

an output shaft for receiving power from an engine;

a drive shaft for transmitting power to a load;

a storage device for storing power;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft said stator being electromagnetically coupled with said third rotor;

a second motor-driving circuit that exchanges electric currents with said second motor to vary the electromagnetic coupling of said stator with said third rotor; and a controller that sends signals to said first and second motor-driving circuits to control said second motor-driving circuit to enable said second motor to regenerate electric power, and to control said first motor-driving circuit to supply the regenerated electric power to said first motor to drive said first motor, and to adjust revolving speeds of said drive shaft and said output shaft so that said revolving speed of said drive shaft is higher than said revolving speed of said output shaft.

9. The power output apparatus in accordance with claim 8, wherein said third rotor is mounted on said first rotor connected with said output shaft.

10. A power output apparatus comprising:

an output shaft for receiving power from an engine;

a drive shaft for transmitting power to a load;

a storage device for storing power;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft said stator being electromagnetically coupled with said third rotor;

a second motor-driving circuit that exchanges electric currents with said second motor to vary the electromagnetic coupling of said stator with said third rotor; and a controller that sends signals to said first and second motor-driving circuits to control said second motor-driving circuit to supply the electric power from said storage device to said second motor to drive said second motor, and to control said first motor-driving circuit to supply the electric power from said storage device to said first motor to drive said first motor, and to adjust revolving speeds of said drive shaft and said output shaft so that said revolving speed of said drive shaft is higher than said revolving speed of said output shaft.

11. The power output apparatus in accordance with claim 10, wherein said third rotor is mounted on said first rotor connected with said output shaft.

* * * * *